(12) United States Patent
Bauer et al.

(10) Patent No.: US 11,181,506 B2
(45) Date of Patent: *Nov. 23, 2021

(54) STANDARDIZING DIFFUSION OF A FLUID INTO TISSUE

(71) Applicant: Ventana Medical Systems, Inc., Tucson, AZ (US)

(72) Inventors: Daniel Bauer, Tucson, AZ (US); David Chafin, Tucson, AZ (US); Michael Otter, Tucson, AZ (US); Abbey Theiss, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/672,213

(22) Filed: Aug. 8, 2017

(65) Prior Publication Data

US 2017/0336363 A1 Nov. 23, 2017

Related U.S. Application Data

(63) Continuation of application No. PCT/EP2016/052447, filed on Feb. 5, 2016.

(60) Provisional application No. 62/113,787, filed on Feb. 9, 2015.

(51) Int. Cl.
*G01N 29/024* (2006.01)
*G01N 29/07* (2006.01)
*G01N 1/30* (2006.01)

(52) U.S. Cl.
CPC ............ *G01N 29/024* (2013.01); *G01N 1/30* (2013.01); *G01N 29/07* (2013.01); *G01N 2291/024* (2013.01); *G01N 2291/02475* (2013.01)

(58) Field of Classification Search
CPC .................................................. G01N 2291/024
See application file for complete search history.

(56) References Cited

U.S. PATENT DOCUMENTS

2012/0232803 A1   9/2012   Viola et al.

FOREIGN PATENT DOCUMENTS

| JP | 06509736 A | 11/1994 |
|---|---|---|
| JP | 2013521506 A | 6/2013 |
| JP | 2014504298 A | 2/2014 |
| JP | 2014505890 A | 3/2014 |
| WO | 9325146 A1 | 12/1993 |
| WO | 2011109769 A1 | 9/2011 |
| WO | 2012085064 A1 | 6/2012 |
| WO | 2012110646 A1 | 8/2012 |
| WO | 2014025392 A1 | 2/2014 |

OTHER PUBLICATIONS

Bauer et al, 2014, "Dynamic Subnanosecond Time-of-Flight Detection for Ultra-precise Diffusion Monitoring and Optimization of Biomarker Preservation", Proceedings of SPIE, 9040:90400B1-90400B10.
International Search Report and Written Opinion dated Jul. 12, 2016 in connection with corresponding International Application No. PCT/EP2016/052447, 20 pgs.

*Primary Examiner* — Bin Shen
(74) *Attorney, Agent, or Firm* — Charney IP Law LLC; Thomas M. Finetti

(57) ABSTRACT

Disclosed are a system and method for evaluating a tissue sample that has been removed from a subject. Movement of fluid through the tissue sample is monitored by measuring time of flight of acoustic waves passed through the tissue sample. A system for performing the method can include a transmitter that outputs the energy and a receiver configured to detect the transmitted energy. Using the disclosed method and system, an optimized protocol for ensuring adequate distribution of the fluid throughout a variety of tissue types and/or sample sizes can be developed and utilized.

17 Claims, 13 Drawing Sheets

STANDARDIZING DIFFUSION OF A FLUID INTO TISSUE

CROSS-REFERENCE TO RELATED APPLICATIONS

This is a continuation of International Patent Application No. PCT/EP2016/052447, filed Feb. 5, 2016, the benefit of which is claimed. Benefit is further claimed to U.S. Provisional Patent Application No. 62/113,787, filed Feb. 9, 2015. The contents of these related applications are incorporated by reference herein.

FIELD

The present disclosure relates to monitoring and controlling diffusion of fluids into tissue specimens. More particularly, the present disclosure relates to generation of optimized protocols for diffusing fluid into tissue specimens using acoustical monitoring.

BACKGROUND

There are many laboratory techniques that involve diffusing a fluid into a tissue specimen. In these techniques, ensuring adequate diffusion of the liquid into the tissue is often a critical factor in the technique's success.

One example is immersion fixation, wherein a collected tissue sample is immersed in a liquid fixative for a period of time sufficient to preserve the tissue. Many standard medical tests rely on such fixed tissues, making accurate preservation of the morphological and molecular features of the fixed tissue a critical requirement. Accordingly, guidelines have been established by oncologists and pathologists for proper fixation of tissue samples. For example, according to the American Society of Clinical Oncology (ASCO), tissues to be tested for HER2 by immunohistochemistry should be fixed in neutral buffered formalin solution for at least 6 hours but not more than 72 hours. Even if this protocol is followed for breast samples, however, it is broad, inefficient, and leaves room for interpretation of best practices. Moreover, such fixation protocols often fail to preserve critical molecular features of the fixed tissue, such as phosphorylation of proteins.

A two-temperature fixation method was recently developed to address these concerns, in which tissue is first immersed in cold fixative solution for a first period of time, followed by heating the tissue for the second period of time. The cold step permits the fixative solution to diffuse throughout the tissue without substantially causing cross-linking. Then, once the tissue has adequately diffused throughout the tissue, the heating step leads to cross-linking by the fixative. The combination of a cold diffusion followed by a heating step leads to a tissue sample that is more completely fixed than by using standard methods. However, different tissue samples can vary considerably in size and shape, while fluids diffuse into different tissue types at different rates. One therefore is left to empirically determine appropriate diffusion times and cross-linking conditions that provide specific fixed tissues with satisfactory histomorphology and immunohistochemical characteristics, which can be a laborious process. Moreover, there is no guarantee that the empirically-determined conditions are the most efficient or optimal conditions.

Additionally, others have developed a process for fixing tissue by first immersing the tissue in a cold formalin solution while simultaneously bombarding the tissue with high-intensity ultrasonic waves, under the theory that the high-intensity ultrasonic waves will accelerate the diffusion of the formalin into the tissue while instigating accelerated crosslinking thru localized temperature increases and the generation of free radicals. However, the method is complicated and the high-intensity ultrasonic waves have the potential to significantly damage the tissues and cause uneven fixation.

The present inventors are unaware of any reason-based methodologies for identifying an optimal diffusion time of a given fluid into a variety of different tissue types, such that a single protocol can be developed that ensures adequate diffusion of the fluid into the tissue without using arbitrarily long diffusion times or other manipulations that could damage the integrity of the tissue.

SUMMARY

The disclosure provides a method and system useful for optimizing diffusion times of fluids into tissue samples and generating standardized protocols applicable to a wide variety different types of tissue samples, particularly varieties of different types of tissue sample of similar sizes. Using the various embodiments of the system and method described herein, progress of diffusion can be monitored in several different tissue samples, and the degree of diffusion in the tissues, can be correlated with quality of a subsequent assay performed on the tissues. From this information, a time-for-diffusion can be determined that ensures adequate diffusion across a wide variety of different tissue types, which can then be used to develop standardized protocols. Further, a tissue preparation system may be programmed to either soak all tissue samples for this minimum amount of time, or to monitor the diffusion of a specific tissue sample and determine an optimal time for the soak, or any combination thereof.

Duodenum; Z: Lymph node; 1: Breast; 2: Brain; 3: Tonsil; 4: Liver; 5: Skin; 6: Spleen; and 7: Fat.

Figure 6A:
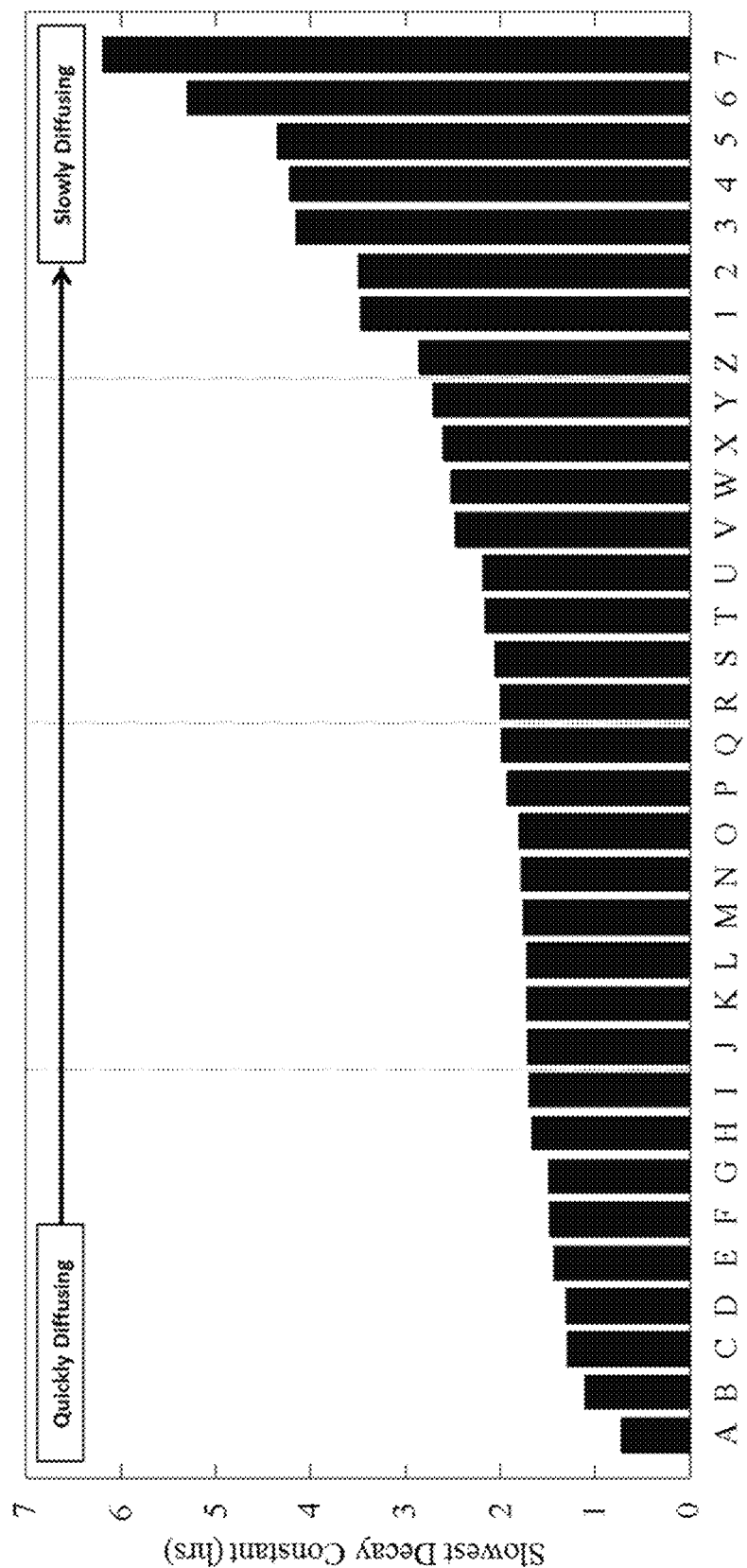
FIG. 6A is a plot of the average decay constant, per organ, and sorted from lowest to highest decay constant for the 33 organs characterized in the study in the Examples. Vertical lines separate the organs types into approximate quartiles. All samples are 5-7 mm thick. Tissues are as follows: A: Artery; B: Gall bladder; C: Rectum; D: Ovary; E: Uterus; F: Stomach; G: Kidney; H: Jejunum; I: Lower GI; J: Ribcage; K: Ileum; L: Muscle; M: Thyroid; N: Cervix; O: Testis; P: Adrenal gland; Q: Colon; R: Appendix; S: Bladder; T: Lung; U: Pancreas; V: Esophagus; W: Tongue; X: Cardiac; Y.
Figure 6B:
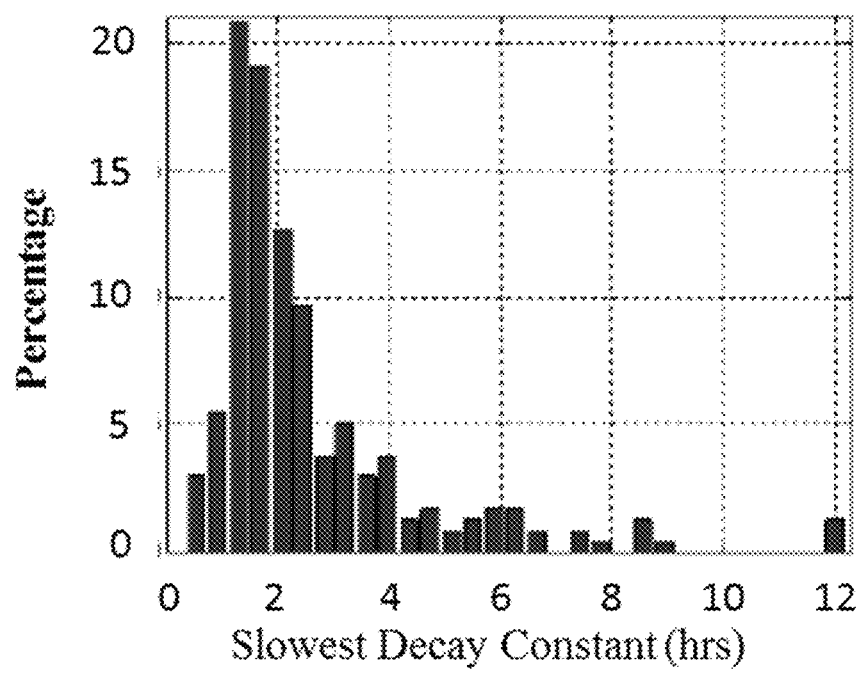

FIG. 6B is a probability density function for all tissue's largest decay constant. The average decay constant was 2 hours and 35 minutes.

Figure 6C:
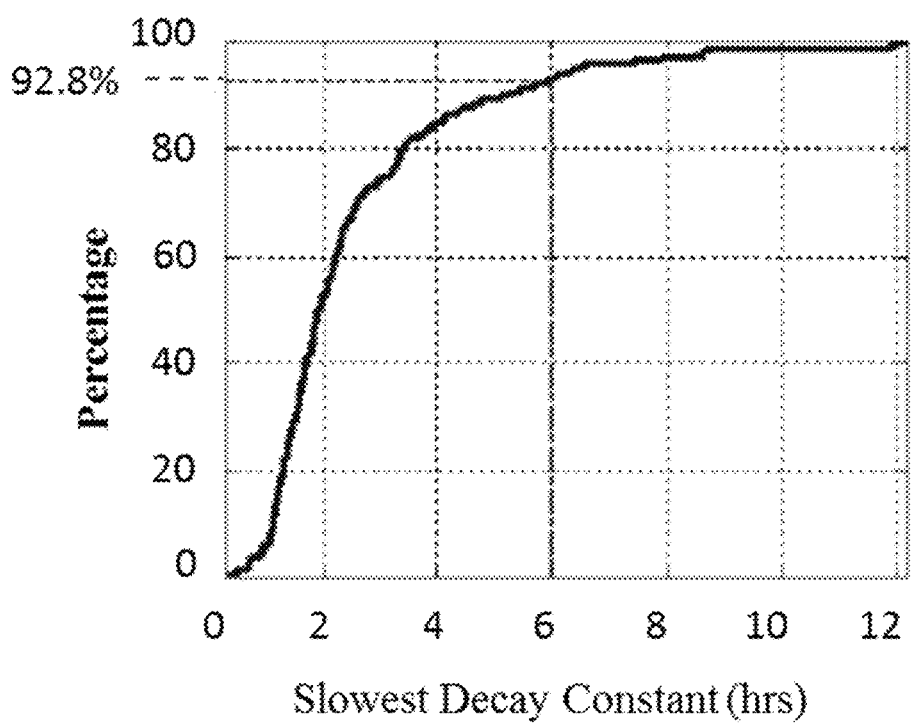

FIG. 6C is a cumulative distribution function for all tissues' decay constant calculated as the integral of the PDF from FIG. 6B. As indicated with the dashed line, 92.8% of samples have a slowest decay constant of less than or equal to 6 hours.

FIG. 7A-D show stain quality comparisons between tissue samples stained using the disclosed methods versus the prior art, according to an exemplary embodiment of the subject disclosure.

Figure 8D:
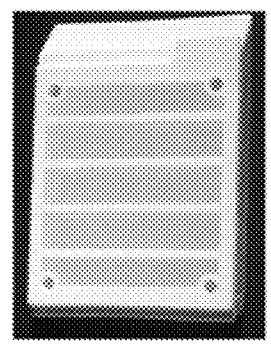
Figure 8C:
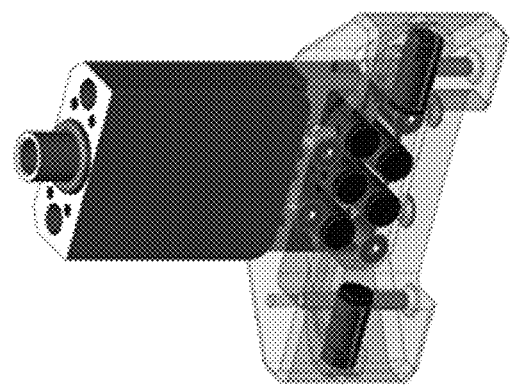
Figure 8B:
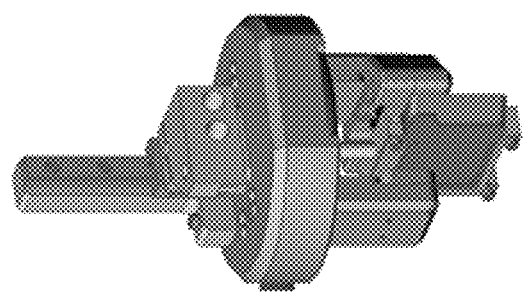
Figure 8A:
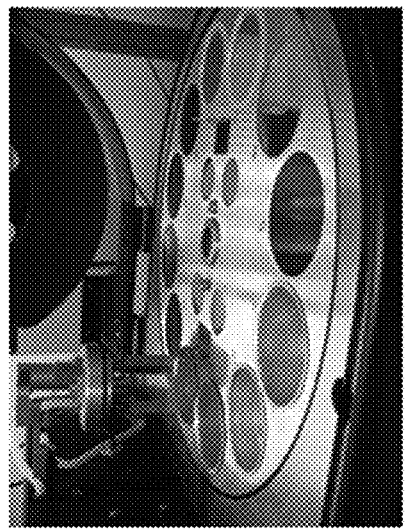

FIGS. 8A-D show various components of a modified tissue processor for performing the processes disclosed herein. FIG. 8A illustrates a Lynx II commercial tissue processor custom modified with ultrasound-based tissue monitoring technology. FIG. 8B illustrates a Solidworks® drawing of scan head attached to dip-and-dunk mechanism shown in 8A. Pairs of 4 MHz transducers were spatially aligned on either side of the cassette, displayed in green, and a TOF value is calculated from each transducer pair. The cassette is secured in the cassette holder, which was vertically translated along the top guiderail to acquire 2D spatial information. FIG. 8C illustrates a the fixture housing the receiving transducers. The orthogonal transducer pair served as a reference channel to detect temporal gradients in the formalin. FIG. 8D is a photograph of the histological cassette used to hold tissue specimens.

Figure 3:
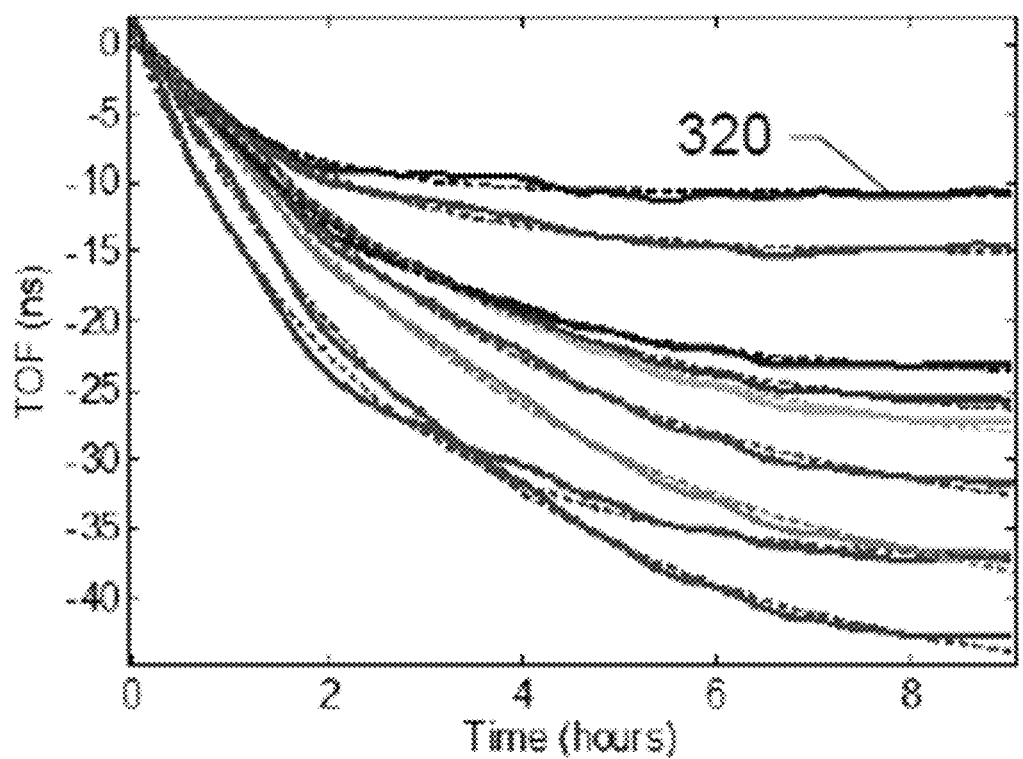
FIG. 3 shows a time-of-flight curve for a tissue sample, according to an exemplary embodiment of the subject disclosure. The graph displays TOF traces generated from a tissue sample cold soaked in 10% NBF. Each signal comes from a different spatial location within the tissue ($\Delta y \approx 1$ mm).
Figure 9A:
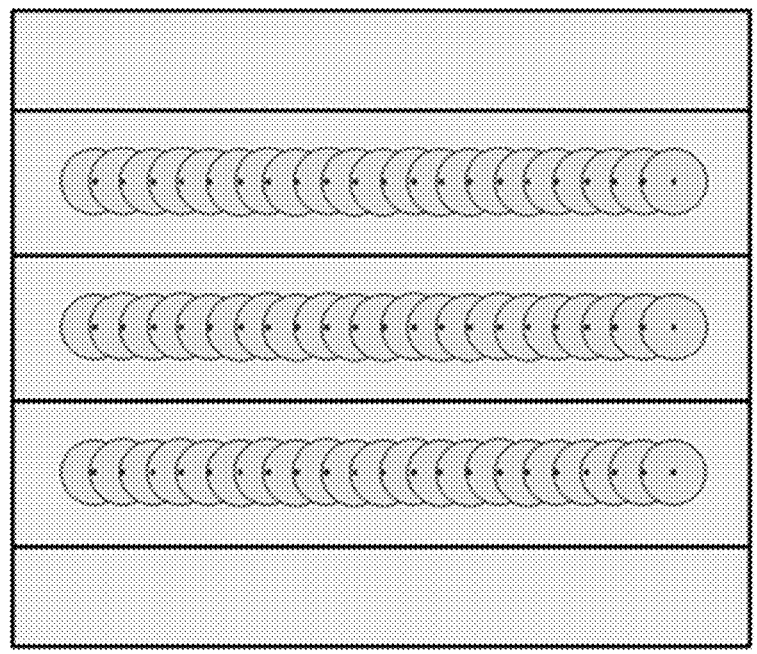
Figure 9B:
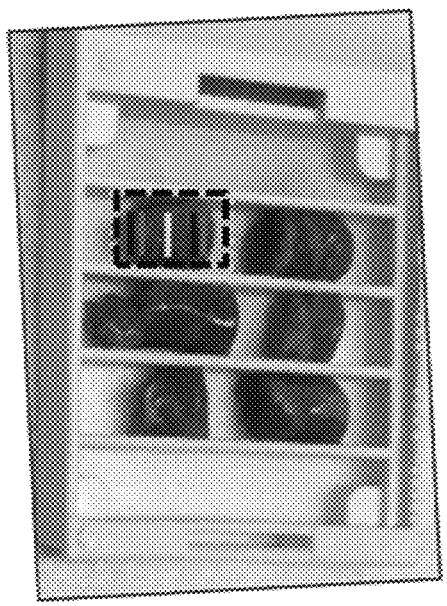

FIGS. 9A and 9B depict an example of how the samples are scanned. FIG. 9A depicts an ultrasound scan pattern, drawn to scale, when imaging a standard sized histological cassette. One pair of transducers scans each column of the cassette. The cassette is vertically translated ≈1 mm and a TOF value is calculated at each position (indicated by the dots). The full-width-half-maximum of the ultrasound beam is 2.2 mm (illustrated by the circles). FIG. 9B is a photograph of a standard sized cassette with 6 pieces of tissue placed inside. The dashed box illustrates a scan field and the dark lines indicate discrete points where a scan is made. The resulting TOF traces are shown at FIG. 3.

Figure 10:
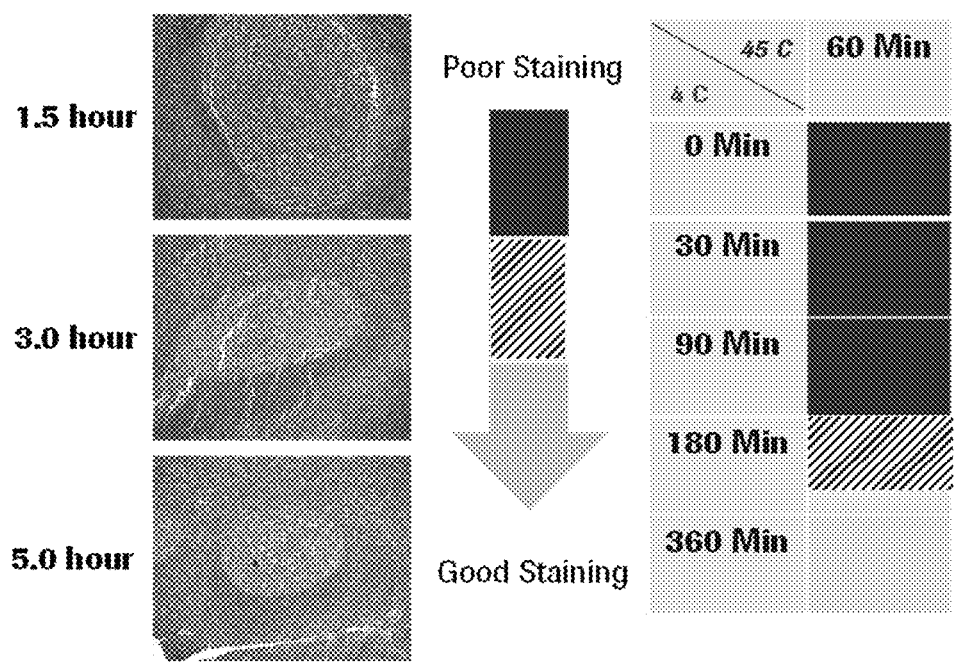

FIG. 10 illustrates the effect of cold soak time on tissue morphology. The images at the left are H&E-stained sections of human tonsil cores fixed with a cold+warm protocol, cold soak times as indicated on the side of H&E pictures. The right summarizes multiple time course experiments shaded to indicate the quality of tissue morphology. Arrow indicates quality of tissue morphology, dark band=poor morphology, patterned band=adequate morphology, and light band=good morphology.

Figure 11:
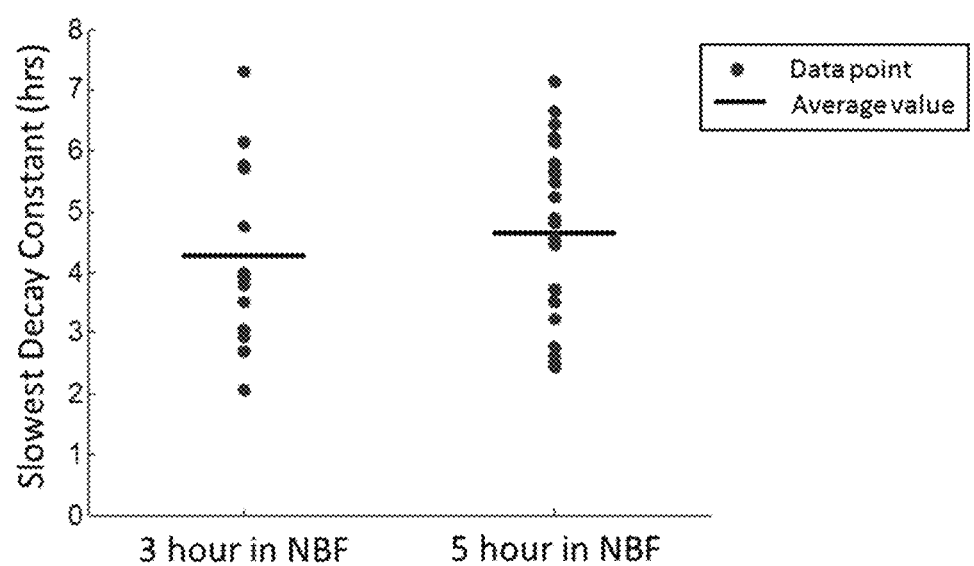

FIG. 11 is a plot of the decay constants for each tissue's slowest diffusing region for datasets collected with 6 mm human tonsils cold soaked in 10% formalin for 3 hours (Left) and 5 hours (Right). Average values are 4 hr 16 min and 4 hr 38 min for the 3 and 5 hour datasets, respectively. The difference of 22 min in average decay constants between the two datasets is statistically insignificant (p=0.45), indicating that the present detection mechanism reports consistent results as a function of monitored time.

Figure 12:
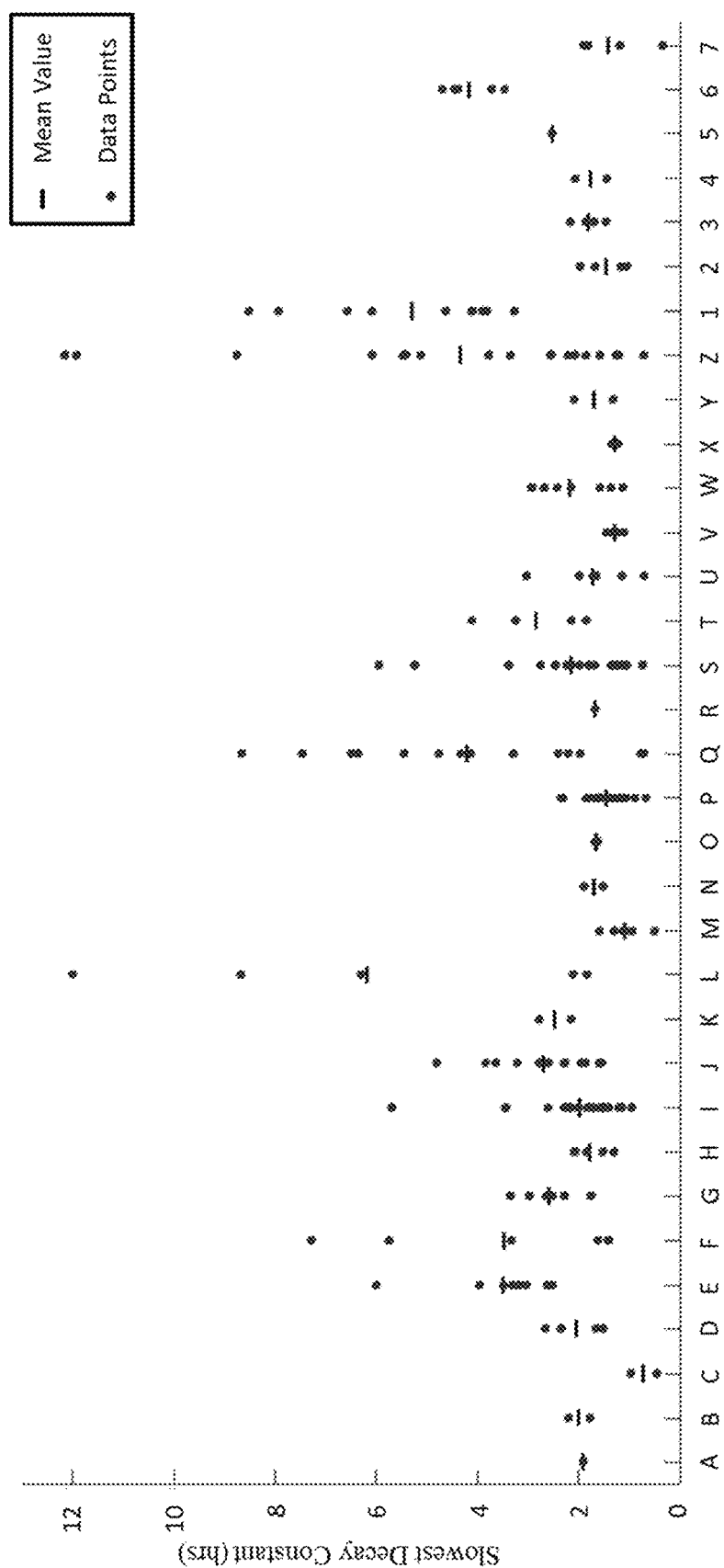

FIG. 12 is a plot of the decay constant from each tissue's slowest diffusing region for the 33 different organs listed. All samples are 5-7 mm thick. Tissues are as follows: A: Adrenal Gland; B: Appendix; C: Artery; D: Bladder; E: Brain; F: Breast; G: Cardiac; H: Cervix; I: Colon; J: Duodenum; K: Esophagus; L: Fat; M: Gallbladder; N: Ileum; O: Jejunum; P: Kidney; Q: Liver; R: Lower GI; S: Lung; T: Lymph node; U: Muscle; V: Ovary; W: Pancreas; X: Rectum; Y: Ribcage; Z: Skin; 1: Spleen; 2: Stomach; 3: Testis; 4: Thyroid; 5: Tongue; 6: Tonsil; and 7: Uterus.

Figure 13:
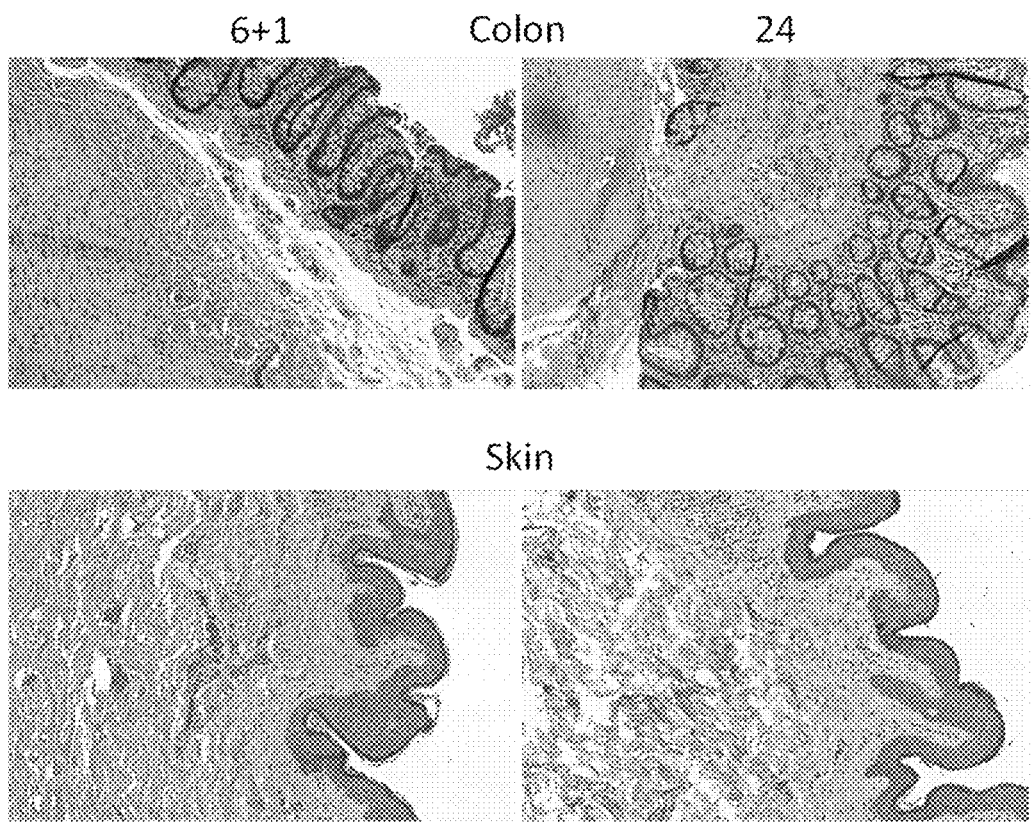

FIG. 13 is a digital image of representative colon and skin samples fixed with a 6+1 protocols (6 hours cold+1 hour hot; left panels) and compared to standard 24 hr room temperature (right panels).

DETAILED DESCRIPTION

The subject disclosure relates to methods for generating static protocols for diffusing a fluid into a plurality of different types of tissues. The prediction is enabled by monitoring the completeness of diffusion of several of the similarly sized tissue samples, and correlating the progression of diffusion with a quality of the subsequent assay. From this, a minimum time for diffusion can be determined that results in an adequate diffusion of fluid into each of the different types of tissue samples for performing the subsequent analytical process.

In an embodiment, a method of developing a standardized protocol for ensuring a sufficient degree of diffusion of a fluid into a multiple different types of tissue samples is provided, said method comprising:
(a) immersing each of a plurality of different types of similarly sized tissue samples into a volume of the fluid;
(b) monitoring movement of the fluid into each of the plurality of different types of tissue samples by measuring time of flight of acoustic waves passed through the tissue sample (TOF); and
(c) determining the time to reach at least a decay constant for each of the plurality of different types of tissue samples ($\tau$); and
(d) selecting a standardized diffusion time for the standardized protocol that corresponds to a time that is based on the longest $\tau$ determined in (c) ($\tau_{slowest}$).

As used herein, a "standardized protocol" is a single protocol that results in adequate diffusion of the fluid into a plurality of different types of tissue samples without requiring individual optimization for each of the different types of tissue samples. What qualifies as "adequate diffusion" will depend on the particular protocol and the desired results. For example, where the diffusion process is a part of an immersion fixation protocol, adequate diffusion can be determined by testing the resulting fixed tissues for, for example, clinically acceptable morphology in hematoxylin and eosin (H&E) stained tissue as determined by a qualified pathologist and/or adequate preservation of biomarkers in the tissue as determined by immunohistochemistry and/or in situ hybridization techniques. Preferably, the standardized protocols generated by the methods described herein reduce the overall processing time compared to generally accepted protocols in the art while providing similar results to individually optimized protocols.

Numerous protocols for processing and/or analyzing a tissue sample require a step in which a reagent is diffused into a tissue sample.

In one exemplary embodiment, the standardized protocol is an immersion fixation protocol Immersion fixation is a technique for preserving a tissue sample by immersing the tissue sample into a liquid fixative solution for a period of time sufficient to allow the fixative to diffuse into the tissue. In contrast, a technique known as perfusion fixation primarily relies on the tissue's vasculature to distribute the fixative throughout the tissue. In another exemplary embodiment, the immersion fixation protocol does not include a perfusion fixation step. In another exemplary embodiment, the immersion fixation protocol uses an aldehyde-based fixative solution, such as glutaraldehyde- and/or formalin-based solutions. In another exemplary embodiment, the standardized protocol comprises immersing a tissue sample, which is in an unfixed state, into a volume of cold aldehyde-based fixative for a period of time sufficient to allow the fixative to diffuse into the tissue to obtain a fixative-diffused tissue sample, followed by incubating the fixative-diffused tissue sample in the presence of a volume of an aldehyde-based fixative at a higher temperature for a sufficient period of time to allow cross-linking to occur (hereafter "two-temperature immersion fixation"). Two-temperature immersion fixation methods represent an improvement over standard single-temperature fixation method and microwave fixation methods by ensuring complete penetration of fixative into the tissue before substantial chemical cross-linking occurs, which improves the speed at which acceptable fixation occurs and better preserves certain target analytes (such as phosphorylated proteins). Examples of aldehydes frequently used for immersion fixation include:

formaldehyde (standard working concentration of 5-10% formalin for most tissues, although concentrations as high as 20% formalin have been used for certain tissues);

glyoxal (standard working concentration 17 to 86 mM);

glutaraldehyde (standard working concentration of 200 mM).

Aldehydes are often used in combination with one another. Standard aldehyde combinations include 10% formalin+1% (w/v) Glutaraldehyde. Atypical aldehydes have been used in certain specialized fixation applications, including: fumaraldehyde, 12.5% hydroxyadipaldehyde (pH 7.5), 10% crotonaldehyde (pH 7.4), 5% pyruvic aldehyde (pH 5.5), 10% acetaldehyde (pH 7.5), 10% acrolein (pH 7.6), and 5% methacrolein (pH 7.6). Other specific examples of aldehyde-based fixative solutions used for immunohistochemistry are set forth in Table 1:

TABLE 1

| Solution | Standard Composition |
| --- | --- |
| Neutral Buffered Formalin | 5-20% formalin + phosphate buffer (pH ~6.8) |
| Formal Calcium | 10% formalin + 10 g/L calcium chloride |
| Formal Saline | 10% formalin + 9 g/L sodium chloride |
| Zinc Formalin | 10% formalin + 1 g/L zinc sulphate |
| Helly's Fixative | 50 mL 100% formalin + 1 L aqueous solution containing 25 g/L potassium dichromate + 10 g/L sodium sulfate + 50 g/L mercuric chloride |
| B-5 Fixative | 2 mL 100% formalin + 20 mL aqueous solution containing 6 g/L mercuric chloride + 12.5 g/L sodium acetate (anhydrous) |
| Hollande's Solution | 100 mL 100% formalin + 15 mL Acetic acid + 1 L aqueous solution comprising 25 g copper acetate and 40 g picric acid |
| Bouin's Solution | 250 mL 100% formalin + 750 mL saturated aqueous picric acid + 50 mL glacial acetic acid |

In some immersion fixation processes, the aldehyde concentration used is higher than the above-mentioned standard concentrations. For example, a high-concentration aldehyde-based fixative solution can be used having an aldehyde concentration that is at least 1.25-times higher than the standard concentration used to fix a selected tissue for immunohistochemistry with a substantially similar composition. In some examples, the high-concentration aldehyde-based fixative solution is selected from: greater than 20% formalin, about 25% formalin or greater, about 27.5% formalin or greater, about 30% formalin or greater, from about 25% to about 50% formalin, from about 27.5% to about 50% formalin, from about 30% to about 50% formalin, from about 25% to about 40% formalin, from about 27.5% to about 40% formalin, and from about 30% to about 40% formalin. As used in this context, the term "about" shall encompass concentrations that do not result in a statistically significant difference in diffusion at 4° C. as measured by Bauer et al., *Dynamic Subnanosecond Time-of-Flight Detection for Ultra-precise Diffusion Monitoring and Optimization of Biomarker Preservation*, Proceedings of SPIE, Vol. 9040, 90400B-1 (2014 Mar. 20).

Other exemplary standardized protocols including a diffusion step will be immediately apparent to the person of ordinary skill in the art.

The immersion conditions in the present methods for generating a standardized protocol should be comparable to the conditions that will be used in the standardized protocol. Thus, where the standardized protocol uses specific temperatures, fluid volumes, atmospheric pressures, etc., the immersion step of the present methods should use the same conditions. Thus, for example, if the standardized protocol is a two-temperature immersion fixation protocol, the same fixative volume and temperature should be used as will be used in the standardized protocol.

The samples do not need to be identically sized or identically shaped. In certain embodiments, the size of the samples will be selected to correlate with the types of samples used in the standardized protocol. For example, tissue fixation protocols are often performed using tissue processing cassettes, such as, for example, (1) "Standard" tissue processing cassettes (see, e.g., CellPath catalog #EAI-0104-10A); (2) "Biopsy" tissue processing cassettes (see, e.g., CellPath catalog #EAK-0104-03A), which are used for typically smaller sized tissue samples; and (3) "resection" tissue processing cassettes (see, e.g., CellPath catalog #EAG-0102-02A), which are typically used for larger tissue samples, such as prostate, brain, breast, and eye tissue. In an embodiment, the tissues are sized to fit one of these types of tissue-processing cassettes ("histologically-sized tissue sample").

The plurality of different types of similarly sized tissue samples ideally should be selected to have a range of diffusion characteristics that is generally representative of the different tissue types that could be used in a subsequent analytical process. This could involve selecting each type of sample that could possibly be used, or a subset thereof. When a subset is used, one or more tissue types that would be expected to have slower diffusion times relative to the rest of the potential tissues types useful in the selected analytical process should be selected. In one example, the plurality of different types of similarly sized tissues include 1 or more, 2 or more, 3 or more, 4 or more, 5 or more, 6 or more, 7 or more, 8 or more, 9 or more, 10 or more, 15 or more, 20 or more, 25 or more, or each of the tissue types selected from the group consisting of artery, gall bladder, rectum, ovary, uterus, stomach, kidney, jejunum, lower GI, ribcage, ileum, muscle, thyroid, cervix, testis, adrenal gland, colon, appendix, bladder, lung, pancreas, esophagus, tongue, cardiac, duodenum, lymph node, breast, brain, tonsil, liver, skin, spleen, and adipose tissue. In another embodiment, the plurality of different types of similarly sized tissues includes at least one of the tissue types selected from the group consisting of lymph node, breast, brain, tonsil, liver, skin, spleen, and adipose tissue.

Movement of fluid into the tissue is tracked by tracking time of flight (TOF) of acoustic waves transmitted through the tissue. In this context, TOF is the amount of time that it takes a single acoustic wave to pass from an acoustic transmitter at a fixed position relative to the tissue sample to an acoustic receiver at a fixed position relative to the tissue sample. Methods for tracking TOF in tissues are described in, for example, US 2013-0224791 and US 2012-0329088, the contents of which are incorporated by reference in their entirety. These methods are based on the observation that, by displacing interstitial fluid in the tissue with a fluid having a discretely different sound velocity than the interstitial fluid (such as formalin) can change the speed at which sound travels through the tissue, thus causing a change in TOF. Depending on whether the fluid increases or decreases the speed of sound passing through the tissue, the TOF will either increase or decrease as more fluid diffuses into the tissue.

TOF may be monitored using a system of acoustic probes, which includes at least one probe capable of transmitting ultrasonic waves (transmitter) and at least one probe capable of detecting ultrasonic waves (receiver). As high-intensity ultrasonic waves can damage tissues, the ultrasonic waves transmitted by the transmitter preferably have an ultrasound intensity that does not significantly cause heating or damage to the tissue. In an embodiment, a transmitter is used that is capable of transmitting ultrasonic waves at a low intensity, such as an intensity of less than 1 W/cm$^2$. For example, in some embodiments, an intensity 0.5 W/cm$^2$ or less, 0.2 W/cm$^2$ or less, 0.05 W/cm$^2$ or less, or 0.02 W/cm$^2$ or less is used. Additionally, the ultrasonic waves may be transmitted at a single frequency, for example, at a frequency selected from 0.5-10 MHz, for example, at 4 MHz+/−1 kHz. The transmitter and receiver may both be operably connected to a processor, which correlates the ultrasonic waves transmitted from the transmitter to the acoustic waves received by the receiver, and calculates TOF therefrom.

The present methods for generating a standardized protocol use changes in TOF to indicate the extent to which a fluid has diffused into the tissue sample. Changes in TOF are tracked for each of the plurality of different types of similarly sized tissue samples over a period of time, the changes in TOF are correlated with a degree of diffusion, and the time required for each of the different types of similarly sized tissue samples to reach a predefined end point is determined. TOF measurements may be taken at discrete time points, or may be measured continuously. Preferably, TOF measurements are not taken using high-intensity ultrasonic waves. As used herein, "high-intensity ultrasonic waves" are ultrasonic waves transmitted at an intensity of 1 W/cm$^2$ or higher. In an embodiment, the TOF measurements are taken using ultrasonic waves transmitted at an intensity of 0.5 W/cm2 or less, 0.2 W/cm2 or less, 0.05 W/cm2 or less, or 0.02 W/cm2 or less. In another embodiment, TOF measurements are taken using ultrasonic waves transmitted at a single frequency selected from the range of 0.5-10 MHz, for example, at 4 MHz+/−1 kHz. In another embodiment, TOF measurements are taken using ultrasonic waves transmitted at an intensity of 0.5 W/cm2 or less, 0.2 W/cm2 or less, 0.05 W/cm2 or less, or 0.02 W/cm2 or less and a single frequency selected from the range of 0.5-10 MHz, for example, at 4 MHz+/−1 kHz. The amount of time required for each tissue type to reach the predefined end point shall hereafter be referred to as a "τ." Preferably, the predefined end point is a predefined decay constant. Sample decay constants are calculated using a nonlinear global optimization algorithm which correlates empirically measured data with variables from a predefined equation. The variables (e.g. decay constant, amplitude, offset) that best align the predefined equation with recorded data are returned as the true values of the tissue.

After the τs are determined for each tissue sample, an amount of time is selected for the standardized protocol based at least in part on the longest τ ($\tau_{slowest}$). The standardized diffusion time is selected such that a sufficient amount of time is provided for adequate diffusion of liquid into each of the different tissue types. The standardized diffusion time does not necessarily need to be equal to one of the $\tau_{slowest}$. In some circumstances, a standardized diffusion time can be selected that is lower than one or more of the τ. For example, the standardized protocol may contain multiple processing steps involving immersion of the tissue sample in the fluid, only one of which is explicitly for the purpose of ensuring adequate diffusion (such as the two-temperature fixation process discussed above). In such a case, it may be possible to stop the designated diffusion step before complete diffusion has been achieved, because the subsequent immersion steps may permit further diffusion of the fluid into the tissue. Additionally, the standardized diffusion time may be higher than each of the τ, for example, in order to compensate for potential variations in the composition, geometry, etc., of different samples of the same tissue types. Thus, in certain exemplary embodiments, the standardized diffusion time is in the range of: $0.5$-$\tau_{slowest}$ to $1.5$-$\tau_{slowest}$; $0.75$-$\tau_{slowest}$ to $1.25$-$\tau_{slowest}$; $0.9$-$\tau_{slowest}$ to $1.1$-$\tau_{slowest}$; or $0.99$-$\tau_{slowest}$ to $1.01$-$\tau_{slowest}$. Other ranges may be useful as well. Preferably, a standardized diffusion time is selected that reduces the overall processing time compared to generally accepted protocols in the art while providing similar results to individually optimized protocols.

In one specific exemplary embodiment, the standardized diffusion time is a part of a two-temperature immersion fixation protocol. As discussed above, the two-temperature immersion fixation protocol involves: (1) a diffusion step in an aldehyde-based fixative solution at a cold temperature; and (2) a cross-linking step, performed at a higher temperature (e.g. from 20° C. to 55° C.) to accelerate the rate of cross-linking induced by the aldehyde-based fixative. In exemplary embodiments, the diffusion step is performed in a fixative solution that is below 20° C., below 15° C., below 12° C., below 10° C., in the range of 0° C. to 10° C., in the range of 0° C. to 12° C., in the range of 0° C. to 15° C., in the range of 2° C. to 10° C., in the range of 2° C. to 12° C., in the range of 2° C. to 15° C., in the range of 5° C. to 10° C., in the range of 5° C. to 12° C., in the range of 5° C. to 15° C. The cold temperatures used in the diffusion step have the dual benefits of increasing the rate of diffusion by inhibiting excessive cross-linking at the periphery of the tissue (which inhibits diffusion of the fixative into the tissue) and of reducing enzymatic activity in the tissue, thereby more accurately preserving molecular details of the tissue (such as phosphorylated proteins). The combination of cold and hot steps helps significantly reduce the processing time required for complete fixation of the tissues. Thus, in such embodiments, the methods of standardizing protocols may include additional processing steps directed to the "hot" step.

In one exemplary embodiment, a method of developing a standardized two-temperature immersion fixation protocol is provided, said method comprising:
(a) immersing each of a plurality of different types of similarly sized tissue samples into a volume of an aldehyde-based fixative at a temperature selected from below 20° C., below 15° C., below 12° C., below 10° C., in the range of 0° C. to 10° C., in the range of 0° C.

to 12° C., in the range of 0° C. to 15° C., in the range of 2° C. to 10° C., in the range of 2° C. to 12° C., in the range of 2° C. to 15° C., in the range of 5° C. to 10° C., in the range of 5° C. to 12° C., in the range of 5° C. to 15° C.;

(b) monitoring movement of the fixative into each of the plurality of different types of tissue samples by measuring time of flight of acoustic waves passed through the tissue sample (TOF); and (c) determining the time to reach at least a first predefined decay constant for each of the plurality of different types of tissue samples (τ); and (d) selecting a standardized diffusion time for the standardized protocol that corresponds to a time that is at least as long as predefined percentage of the longest τ determined in (c);

(e) immersing each of the plurality of different types of similarly sized tissue samples in a volume of the aldehyde-based fixative used in (c) at the same temperature used in (c) for the standardized diffusion time selected in (d) to obtain fixative-diffused tissue samples;

(f) immersing each of the fixative-diffused tissue samples into a volume of an aldehyde-based fixative and evaluating adequacy of fixation at a plurality time points, wherein the aldehyde-based fixative is at temperature in the range of 20° C. to 55° C.;

(g) determining a minimal time required for heating each fixative-diffused tissue samples at the selected temperature to obtain an adequately-fixed tissue sample (minimal fixation time); and (h) selecting a standardized fixation time that is at least as long as the longest minimal fixation time;

wherein the standardized immersion fixation protocol comprises: (1) a diffusion step comprising immersing a subject tissue sample in a volume of the aldehyde-based fixative used in (c) at the same temperature used in (c) for the standardized diffusion time selected in (d) to obtain a fixative-diffused subject tissue samples; and (2) immersing the fixative-diffused tissue samples in the presence of a volume of the same aldehyde-based fixative used in (f) at the same temperature used in (h) for the standardized fixation time. In some embodiments, the standardized immersion fixation protocol does not include exposure of the subject tissue sample to high intensity ultrasonic waves.

Using these methods, a method for fixing a tissue sample of up to 7 mm thickness has been identified, the method comprising:

(a) immersing the tissue sample in an aldehyde-based fixative at a temperature of 0° C. to 15° C., and permitting the cold fixative to diffuse into the tissue for more than 5 hours to obtain a fixative-diffused tissue sample; and (b) heating the fixative-diffused tissue sample in the presence of an aldehyde-based fixative at a temperature of 20° C. to 55° C. for a sufficient amount of time to permit cross-linking.

In certain embodiments, the tissue samples are chosen to be from 1 mm thickness to 7 mm thickness. In other embodiments, the cold fixative is at a temperature of from 5° C. to 12° C. In some embodiments, the combined time of (a) and (b) is 8 hours or less. In some embodiments, the tissue sample is not exposed to high-intensity ultrasonic waves during (a) or (b). In some embodiments, the tissue sample is not exposed to ultrasonic waves at an intensity of greater than 1 W/cm$^2$ during (a) or (b). In some embodiments, the tissue sample is not exposed to ultrasonic waves at an intensity of greater than 0.5 W/cm$^2$, greater than 0.2 W/cm$^2$, greater than 0.05 W/cm$^2$, or greater than 0.02 W/cm$^2$ during (a) or (b).

Figure 1:
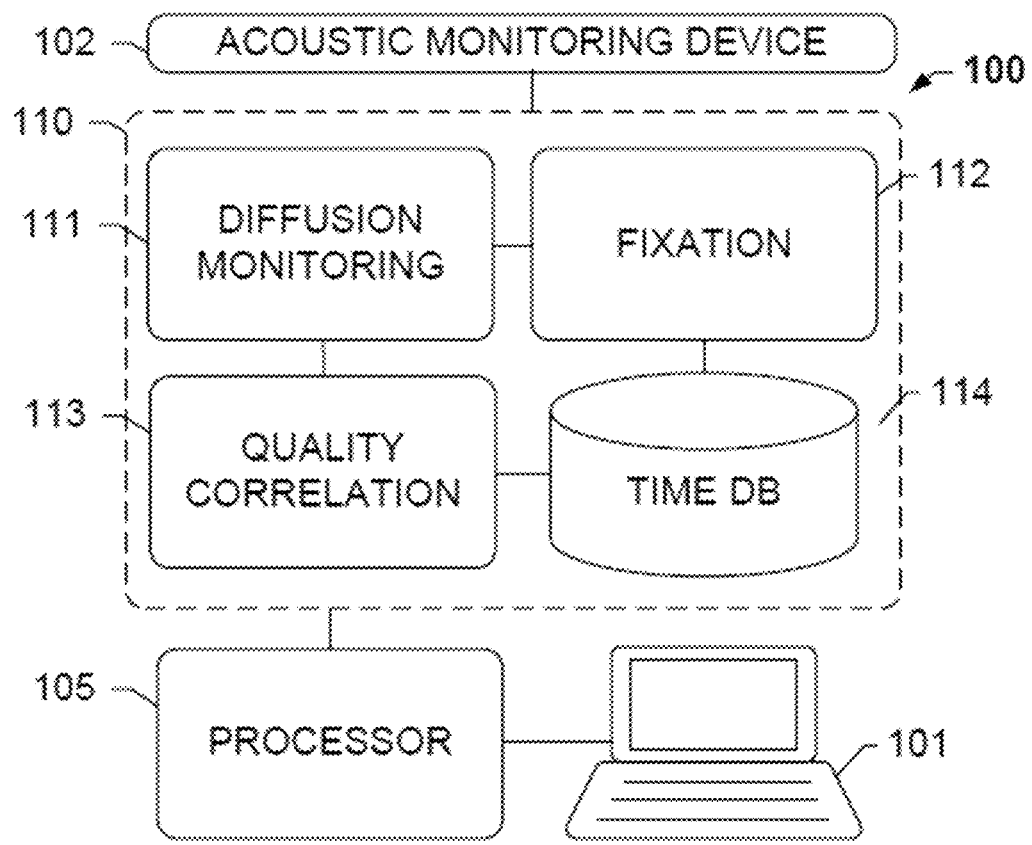
FIG. 1 shows a system for optimizing tissue fixation using diffusion monitoring, according to an exemplary embodiment of the subject disclosure.

FIG. 1 shows a tissue processing system 100 for optimizing tissue fixation using diffusion monitoring, according to an exemplary embodiment of the subject disclosure. System 100 comprises an acoustic monitoring device 102 communicatively coupled to a memory 110 for storing a plurality of processing modules or logical instructions that are executed by processor 105 coupled to computer 101. Acoustic monitoring device 102 may detect acoustic waves that have traveled through a tissue sample and may include one or more transmitters and one or more receivers. The tissue sample may be immersed in a liquid fixative while the transmitters and receivers communicate to detect time of flight (TOF) of acoustic waves. Processing modules within memory 110 may include logical non-transitory computer-readable instructions for enabling processor 105 to perform operations including monitoring the diffusion of a fixative through a tissue sample, evaluating the speed of an acoustic wave traveling through the tissue sample based on time of flight, determining the time to reach at least a decay constant for each of the plurality of different types of tissue samples, selecting a standardized diffusion time, executing fixation protocols using the standardized diffusion time and a minimum fixation time, performing quality correlation for training purposes, storing standardized diffusion times and other results in a database, and other operations that potentially result in an output of quantitative or graphical results to a user operations computer 101. Consequently, although not shown in FIG. 1, computer 101 may also include user input and output devices such as a keyboard, mouse, stylus, and a display/touchscreen.

For example, the measurements from the acoustic sensors in acoustic monitoring device 102 may be received by a diffusion monitoring module 111 to track the change of a ToF of acoustic signals through the tissue sample. This includes monitoring the tissue sample at different positions over time to determine diffusion over. As formalin penetrates into tissue it displaces interstitial fluid. This fluid exchange slightly changes the composition of the tissue volume because interstitial fluid and formalin have discrete sound velocities. The output ultrasound pulse thus accumulates a small transit time differential that increases as more fluid exchange occurs. Diffusion monitoring therefore includes dynamically tracking and quantifying the formalin diffusion until the tissue is at complete osmotic equilibrium and no more diffusion takes place. As described herein, how long it takes for diffusion to reach an optimum level (for example, 63% completion) varies with organ type, tissue constants, spatial heterogeneity, temperature, placement in the cassette, etc. These factors are generally controlled for based on the description of the diffusion monitoring system described in U.S. Patent Publication 2013/0224791. Generally, formalin diffusion is highly correlated with a single exponential trend, where the time transient of the trend can be completely characterized by a decay constant as further described herein. Once the decay constant is reached, there is sufficient formaldehyde inside the tissue to guarantee quality staining. Using the curves for each tissue sample, the diffusion is tracked at every position, and the region with the longest decay constant is correlated with an optimal result or an existing staining result. For training purposes or to compare with existing or known staining results, quality correlation module 113 may be invoked. Based on the results, a fixation module 112 may execute a fixation protocol such as a standardized protocol as described herein.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 110 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. For instance, classification module 118 may be invoked during operation of training module 111, as well as during operation of CNN module 116. Each module may call another module when needed to be executed.

Figure 2:
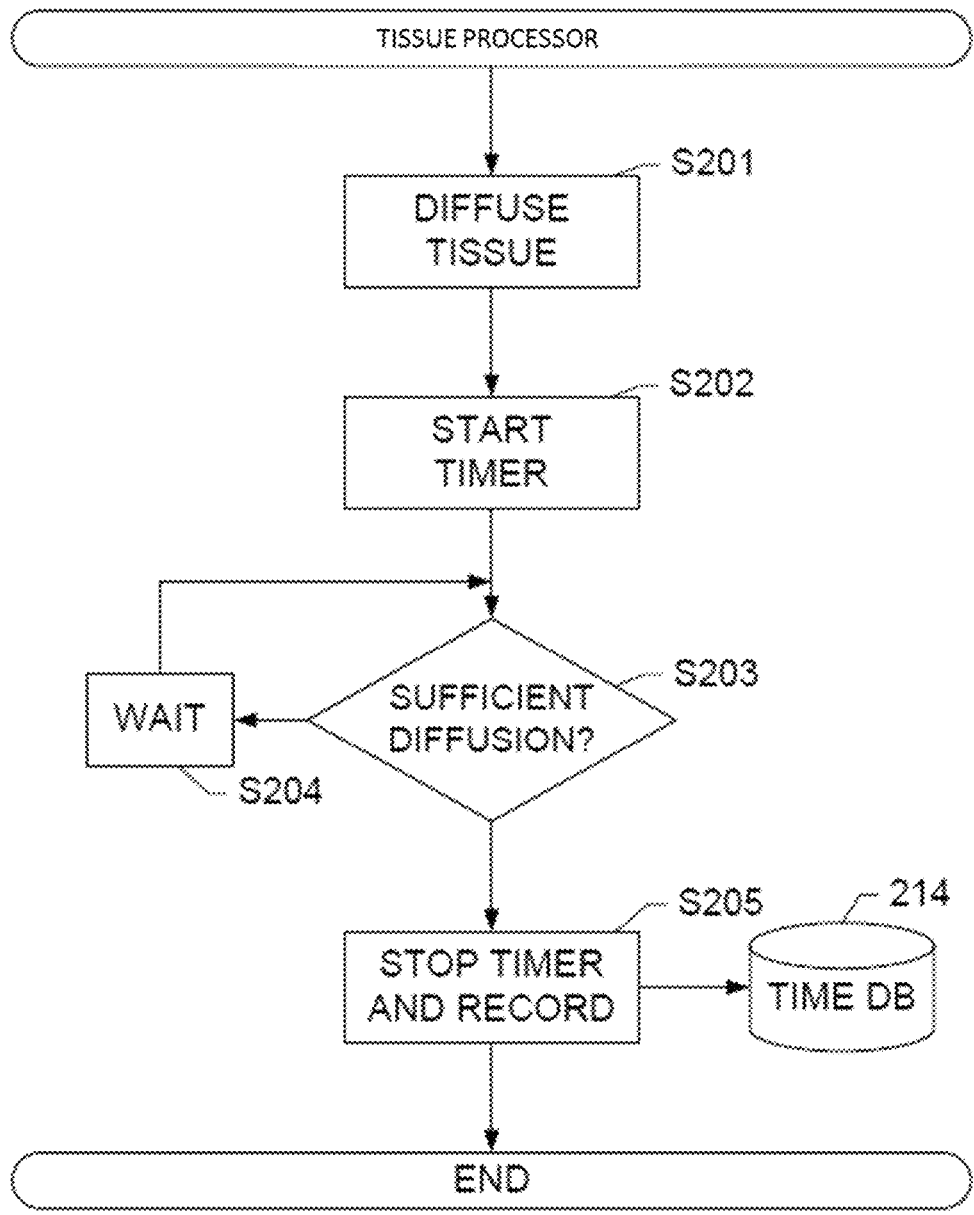
FIG. 2 shows a method for determining an optimal time for diffusing a tissue sample, according to an exemplary embodiment of the subject disclosure.

FIG. 2 shows a method for determining an optimal time for diffusing a tissue sample, according to an exemplary embodiment of the subject disclosure. The method begins with formalin diffusion S201 of tissue samples that may be used to train the system. Upon soaking, a timer is started (S202) and the diffusion of the tissue sample is monitored (S203). A determination is made as to whether or not the tissue is sufficiently diffused (S203). This determination may be based on the correlation of formalin diffusion with a single exponential trend, where the time transient of the trend can be completely characterized by a decay constant. For example, a reference compensated ToF trace from a tissue sample may be empirically determined to be highly correlated with a single exponential curve of the form:

$$TOF(x,y,t) = C(x,y) + Ae^{-t/\tau(x,y)}$$

where C is a constant offset in nanoseconds (ns), A is the amplitude of the decay in nanoseconds (ns), $\tau$ is the decay constant in hours, and the spatial dependence (x, y) is explicitly stated. The signal amplitude represents the magnitude of the diffusion and is thus directly proportional the amount of fluid exchange. The decay constant represents the time for the amplitude to decrease by 63% and is inversely proportional to the rate of formalin diffusion into the tissue (i.e. large decay constant=slowly diffusing). To calculate these metrics, ToF diffusion trends may be fitted to the above equation using non-linear regression. Further, the scanning capabilities of the acoustic system enable calculating and tracking which spatial volume of the tissue sample diffuses the slowest. This decay constant represents the limiting factor for when the tissue is thoroughly diffused and is referred to as the slowest decay constant ($\tau_{slowest}$).

If the decay constant is not reached, the method simply waits while continuing measurement (S204). Once the decay constant is reached, there is sufficient formaldehyde inside the tissue to guarantee quality staining, and the timer may be stopped (S205) and the time may be recorded in a database record associated with the specific tissue type and other details in database 214. In the example of human tonsil tissue, experimental results showed that 6 mm human tonsil samples require at most 5 hours of cold diffusion time in 10% NBF to have optimal of 4.5 hours, based on a time course experiment using 6 mm diameter cores of human tonsil tissues submerged into 4° C. NBF followed by 1 hour in 45° C. NBF. Based on the experimental results, this determination is enabled by the equation:

$$\frac{t_{done}}{\tau_{slowest}} = \frac{5 \text{ hour}}{4.5 \text{ hour}} \Longrightarrow t_{done} \approx \tau_{slowest}$$

Where $t_{done}$ is the needed diffusion time in cold formalin and $\tau_{slowest}$ represents the decay constant of the slowest diffusing volume of the tissue. Therefore, this protocol may be able to better predict when the sample is optimally diffused based on analysis to predict when the sample is most properly stained, or record several ToF diffusion curves and use them to predict optimal fixation time depending on the sample.

An exemplary ToF diffusion curve is shown in FIG. 3. As described herein, for each tissue sample, the diffusion is tracked at every position, and the region with the longest decay constant is correlated with an optimal result or an existing staining result. FIG. 3 shows ToF traces 320 generated from a human tonsil sample that was cold soaked in 10% NBF. Each curve represents a signal from a different spatial location within the tissue with a 1 mm shift for each reading.

Figure 4:
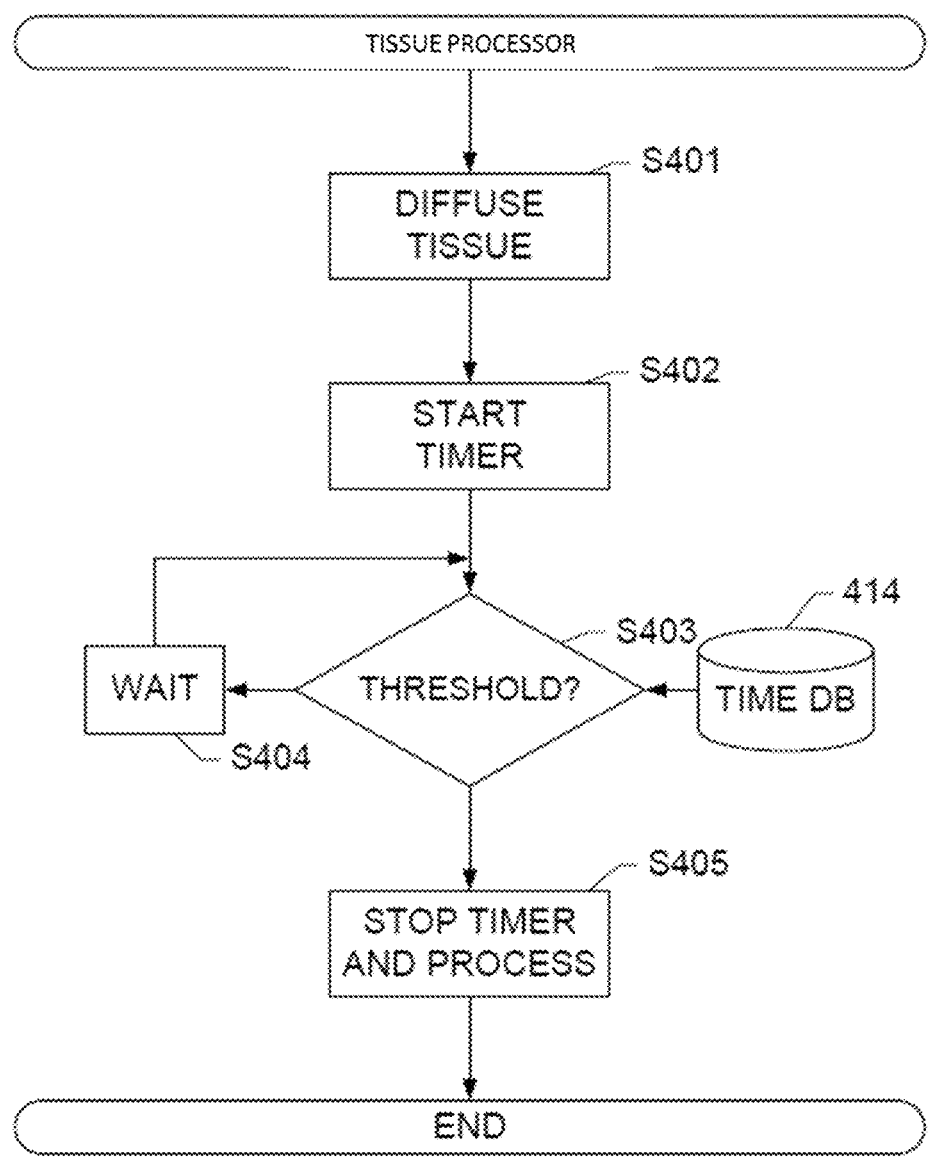
FIG. 4 shows a method for optimizing tissue fixation, according to exemplary embodiments of the subject disclosure.

FIG. 4 shows a method for optimizing tissue fixation, according to exemplary embodiments of the subject disclosure. In this exemplary embodiment, a tissue processing system may be equipped with acoustic sensors on board for real-time monitoring of each tissue sample as it is provided into the system. The method begins with formalin diffusion (S401) of a tissue sample. Upon soaking, a timer is started (S402) and the diffusion of the tissue sample is monitored for a threshold diffusion (S403). A determination is made as to whether or not the tissue is sufficiently diffused (S403). This may be based on one or more threshold diffusion constants stored in time database 414. For example, the training embodiment of FIG. 2 may be used to provision the thresholds into database 414, and subsequent tissue samples with similar characteristics (such as tissue type, age, etc.) may be processed using the decay constants or time periods provisioned into database 414. Therefore, a threshold may either include a decay constant threshold or a time period threshold.

In either case, if the threshold is not reached, the method simply waits while continuing measurement (S404). Once the threshold time or decay constant is reached, there is sufficient formaldehyde inside the tissue to guarantee quality staining, and the timer may be stopped (S405) and the tissue is processed, by switching to heated formalin for a specified minimum time period, e.g. 1 hour. The minimum time period may be any time period sufficient for fixation to take place while the tissue is subject to heat to increase crosslinking kinetics. Any other process may be subsequently performed.

As described herein, Applicants have conducted a series of experiments based on histological staining results and monitored diffusion, resulting in a rule set for how much diffusion is needed across a variety of tissue types to guarantee quality staining. Diffusion of formalin into the tissue samples was dynamically monitored to determine how much crosslinking agent is required to produce ideal staining from downstream assays throughout the sample. A sample set of human tonsils was scanned using acoustic sensors and subsequently stained for morphology to calibrate the process. In one exemplary embodiment, the acoustic sensors may include pairs of 4 MHz focused transducers (TA0040104-10, CNIRHurricane Tech (Shenzhen) Co., Ltd.) that are spatially aligned such that a tissue sample may be placed at their common foci. Samples of tonsil tissues of precise sizes were obtained by using tissue punches of either 4 or 6 mm in diameter. For cold+warm fixation, 6 mm tonsil cores were placed into 10% NBF (Saturated aqueous formaldehyde from Fisher Scientific, Houston, Tex., buffered to pH 6.8-7.2 with 100 mM phosphate buffer) previously chilled to 4° C. for either 3 or 5 hours. Samples were then removed and placed into 45° C. NBF for an additional 1 hour to initiate crosslinking. After fixation, samples were furthered processed in a commercial tissue processor set to an overnight cycle and embedded into wax. The commercial tissue processor may be a commercial dip-and-dunk tissue processor such as the Lynx II manufactured by Electron Microscopy Sciences® that may be modified to include the acoustic sensor assembly. A mechanical head was designed using Solidworks® software to fit around and seal a standard reagent canister. Once sealed, an external vacuum system would initiate to degas the bulk reagent as well as the contents of the cassette, including the tissue. A cassette holder was designed for use with a standard sized histological cassette that securely held the tissue to prevent the sample from slipping during the experiment. Subsequent to fixation, 6 tonsil cores from each run were sectioned lengthwise and embedded cut side down in the mold. This multiblock arrangement allows for each of the 6 cores to be stained simultaneously. Good histomorphology was observed with these samples.

Figure 5:
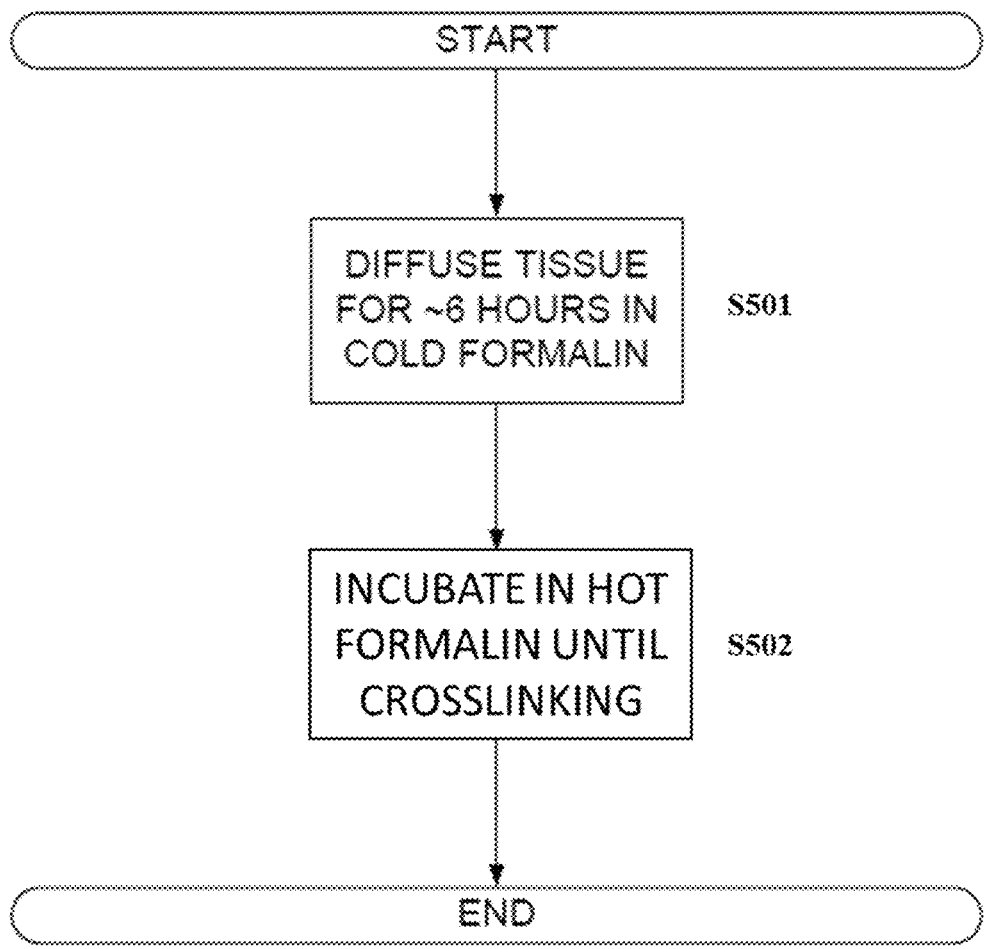
FIG. 5 shows an optimized protocol for tissue fixation, according to an exemplary embodiment of the subject disclosure.

FIG. 5 shows an optimized protocol for tissue fixation, according to an exemplary embodiment of the subject disclosure. Subsequent to the tonsil experiment, over two hundred samples compromising 33 different types of tissues were analyzed, with the result that 6 hours in 10% formalin will guarantee enough crosslinking agent to produce proper staining results. This cold diffusion time was then verified with staining on several different types of tissues. This study indicates a protocol of 6 hours in cold formalin (S501) can standardize and optimize tissue processing across all types of tissues, up to 7 mm thick, and guarantee ideal biomarker and morphological structure preservation with a rapid protocol compared to standard room temperature fixation. In other words, for any given tissue type, a 4 degree 10% neutral-buffer formalin soak for 6 hours cold (S501) followed by a 1 hour warm soak (S502) will guarantee quality staining resulting in more accurate diagnoses. In exemplary embodiments, the diffusion step (S501) is performed in a fixative solution that is either below 20° C., below 15° C., below 12° C., below 10° C., in the range of 0° C. to 10° C., in the range of 0° C. to 12° C., in the range of 0° C. to 15° C., in the range of 2° C. to 10° C., in the range of 2° C. to 12° C., in the range of 2° C. to 15° C., in the range of 5° C. to 10° C., in the range of 5° C. to 12° C., or in the range of 5° C. to 15° C. The cold temperatures used in the diffusion step have the dual benefits of increasing the rate of diffusion by inhibiting excessive cross-linking at the periphery of the tissue (which inhibits diffusion of the fixative into the tissue) and of reducing enzymatic activity in the tissue, thereby more accurately preserving molecular details of the tissue (such as phosphorylated proteins).

The cross-linking step (S502) is performed at a higher temperature (e.g. from 20° C. to 55° C.) to accelerate the rate of cross-linking induced by the aldehyde-based fixative. The combination of cold and hot steps helps significantly reduce the processing time required for complete fixation of the tissues.

FIGS. 6A-C show determinations of a time-of-fixation and corresponding decay constants for various tissue samples, according to an exemplary embodiment of the subject disclosure. A total of 236 samples were monitored representing 33 distinct organs and types of biological tissue. Referring to FIG. 6A, the average decay constant from each respective organ type is displayed, sorted from lowest to highest decay constant. Displayed in this fashion, more quickly diffusing tissues register to the left (i.e. smaller decay constants) and slowly diffusing tissues register to the right (i.e. larger decay constants). Notably, it is observed that several of the tissue types that the American Society of Clinical Oncology and the College of American Pathologists (ASCO/CAP) has recognized as needing extra time in formalin (e.g. breast, brain, fat) are located on the far right of the graph amongst the slowest quarter of tissues. Therefore, the disclosed ToF diffusion protocol and monitoring system have confirmed the ASCO/CAP guidelines of slowing diffusing tissues.

As previously described, an empirically determined time needed in cold formalin may be depicted as:

$$\frac{t_{done}}{\tau_{slowest}} = \frac{5 \text{ hour}}{4.5 \text{ hour}} \Rightarrow t_{done} \approx \tau_{slowest}$$

From this general equation it may be concluded that samples having diffused to approximately one decay constant will have sufficient crosslinking agent throughout to stain properly. This general ground rule may be applied to all different types of tissues because the time needed to sufficiently perfuse a tissue will scale with the rate of diffusion. In other words, slowly diffusing tissues will automatically need longer diffusion times whereas faster diffusing tissues will require less time in formalin. Moreover, the decay constants from the cumulative tissue dataset depicted in FIG. 6A were analyzed to determine how long samples needed to be subjected to cold diffusion in 10% NBF to produce excellent downstream biomarker preservation. The probability density function (PDF) is plotted in FIG. 6B. The majority of samples have a slowest decay constant of about 2 hours. The average decay constant was 2 hours and 35 minutes. A significant portion display values up to roughly 4 hours and further outliers can be seen with even longer decay constants. Moreover, FIG. 6C depicts the cumulative density function (CDF) that is the integral of FIG. 6B. From the CDF, it is observed that 52.5% of samples have a slowest decay constant of less than 2 hours. Similarly, 84.8% of samples have decay constants less than 4 hours and 92.8% are less than 6 hours. From the tonsil-based experiments and the empirically-determined time equation, the data suggests that tissue samples need to be in cold formalin for an amount of time approximately equal to their slowest decay constant. Therefore, FIG. 6C would predict that nearly 93% of samples cold soaked in 10% NBF for 6 hours would stain pristinely with downstream assays.

This estimate of needing one decay constant of cold diffusion time is based on perfect staining throughout that sample, and is substantially more stringent than what is considered a diagnosable slide in current medical practice. Additionally, the rule set depicted in FIG. 5 was determined based on the amount of formalin in the slowest diffusing part of the tissue, meaning at threshold the majority of the tissue already has more than the critical amount of formalin needed for ideal staining. It therefore stands to reason that the remaining 7% of samples that are not at threshold after 6 hours of cold diffusion will still stain adequately enough for a clinician to make a diagnosis.

However, because diffusion time scales with the square of tissue thickness, samples thinner than 5 mm will diffuse significantly faster than larger tissues. Because additional time in cold formalin has no detrimental effects on cancer biomarker or tissue morphological status, the presented $t_{done}$ will well preserve cancer biomarkers and morphology in all samples up to 7 mm thick. Many factors can affect the rate at which the crosslinking agent formalin will diffuse into tissue including sample composition, thickness, temperature, orientation in cassette, and preanalytical tissue handling to name a few. The presented time needed in cold formalin is especially powerful because all of these factors are taken into account. Additionally, the large number of samples monitored in the study and the scanning capability of the disclosed system ensure 6 hours in cold formalin will ideally preserve tissue despite variability from different types of tissue (intersample variation) as well as contributions from tissue heterogeneity (intrasample variation). Moreover, because the slowest diffusing tissues (fat, brain, etc) were included in this study, other types of tissues not exclusively monitored may not be a limiting factor of a potential protocol. Thus, all samples up to 7 mm thick will stain properly after 6 hours in cold formalin.

Figure 7A:
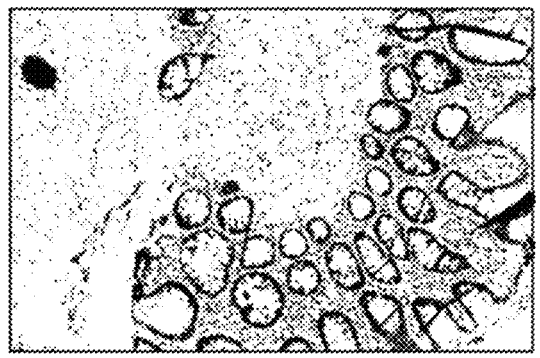
Figure 7B:
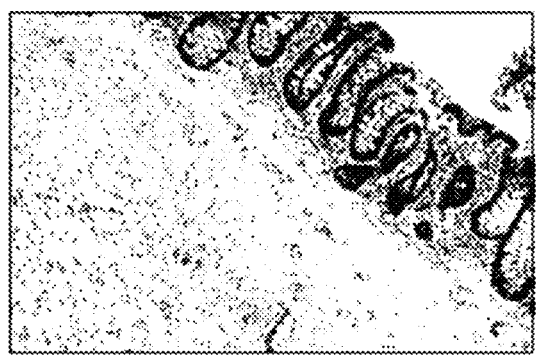
Figure 7C:
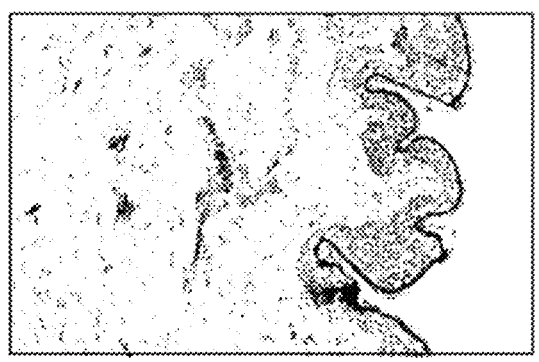
Figure 7D:
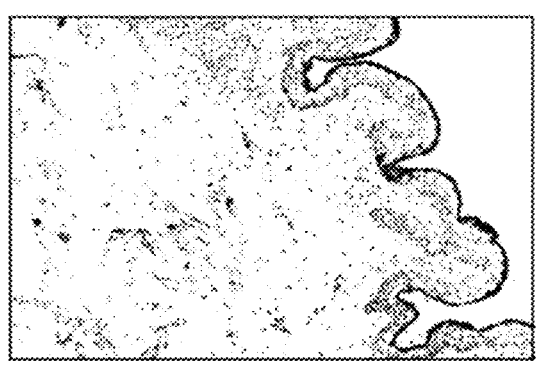

FIGS. 7A-7D show stain quality comparisons between tissue samples stained using the disclosed methods versus the prior art, according to an exemplary embodiment of the subject disclosure. FIGS. 7A and 7B show 6 mm colon tissue samples fixed with a static 6+1 (FIG. 7A) and as comparison, a 24 hr room temperature protocol (FIG. 7B) and analyzed for quality of histomorphology. Similarly, FIGS. 7B and 7C show 6 mm skin tissue samples fixed with 6+1 (FIG. 7C) and 24 hr (FIG. 7D) protocols. All samples fixed with the 6+1 protocol had identical histomorphology compared to the same samples fixed with gold standard methods. This verifies that an analytical technique, based on time of flight principles, can be used to monitor diffusion of NBF in real time and optimize results.

EXAMPLES

I. Methods

A. Tissue Acquisition

Human tonsil tissue was obtained fresh and unfixed from a local Tucson hospital under a contractual agreement with approved protocols. Whole tonsils from surgery were transported to Ventana Medical Systems Inc. (VMSI) on wet ice in biohazard bags. Samples of tonsil tissues of precise sizes were obtained by using tissue punches of either 4 or 6 mm in diameter (Such as Miltex #33-36). For cold+warm fixation, 6 mm tonsil cores were placed into 10% NBF (Saturated aqueous formaldehyde from Fisher Scientific, Houston, Tex., buffered to pH 6.8-7.2 with 100 mM phosphate buffer) previously chilled to 4° C. for either 3 or 5 hours. Samples were then removed and placed into 45° C. NBF for an additional 1 hour to initiate crosslinking. After fixation, samples were furthered processed in a commercial tissue processor set to an overnight cycle and embedded into wax.

Additional tissue samples were collected from surgeries under a waiver of consent, using procedures approved by the University of Washington Institutional Review Board. Upon excision, fresh tissue was carried to the pathology laboratory, generally within 30-60 minutes, and after the diagnostic pathologist had taken sections needed for diagnosis, 6 mm cores were taken for further experimentation. For comparison of histomorphology between tissue fixed with experimental conditions and tissue generated by pathology department histotechnologists in a CLIA- and College of American Pathologists (CAP)-certified laboratory, unstained slides from the clinical tissue block generated in each case (10-48 hours RT formalin fixation) were collected.

B. Tissue Staining

After fixation, 6 tonsil cores from each run were sectioned length wise and embedded cut side down in the mold. This multiblock arrangement permitted each of the 6 cores to be stained simultaneously. Samples were stained manually by first dewaxing the samples with xylene and then with graded ethanols and into deionized water. Hematoxylin was applied by dipping a rack of slides into Gill II hematoxylin (Leica Microsystems) for 3 minutes followed by extensive washes in deionized water. Slides were then submerged into Scott's Original Tap Water (Leica Microsystems) for 1 minute and extensively washed in deionized water. To transition to Eosin, racks of slides were submerged first into 70% ethanol then into Eosin Y (Leica Microsystems) for 2 minutes. Slides were washed extensively, at least 4× in 100% ethanol, equilibrated into xylene and coverslipped.

C. TOF Experimental Setup

Pairs of 4 MHz focused transducers (TA0040104-10, CNIRHurricane Tech (Shenzhen) Co., Ltd.) were spatially aligned and a sample was placed at their common foci. One transducer, designated the transmitter, sends out an acoustic pulse that traverses the coupling fluid (i.e. formalin) and tissue and is detected by the receiving transducer. Initially, the transmitting transducer was programmed with a waveform generator (AD5930, Analog Devices) to transmit a sinusoidal wave for several hundred microseconds. That pulse train was then detected by the receiving transducer after traversing the fluid and tissue. The received ultrasound sinusoid and the transmitted sinusoid were compared electronically with a digital phase comparator (AD8302, Analog Devices). The output of the phase comparator yielded a valid reading during the region of temporal overlap between the transmitted and received pulses. The output of the phase comparator was allowed to stabilize before the output was queried with an integrated analog to digital converter on the microcontroller (ATmega2560, Atmel). The process was then repeated at multiple acoustic frequencies across the bandwidth of the transducer to build up the phase relationship between the input and output sinusoids across a frequency range. This acoustic phase-frequency sweep was then directly used to calculate the TOF using a post-processing algorithm analogous to acoustic interferometry and capable of detecting transit times with subnanosecond accuracy.

The speed of sound in fluid has a large temperature dependence (e.g. $\Delta t_{water} \approx 2.3$ ns/° C.·mm at 4° C.) that can greatly affect acoustic transit times especially because TOF is an integrated signal over the path length of the transducers. Over the course of an experiment relatively large variations in the total TOF are typically observed due largely to the effects of thermal fluctuations throughout the fluid. To compensate for these environmental fluctuations, the TOF was also calculated through only formalin and this acquisition, referred to as the reference channel, was used to compensate for spatiotemporal thermal gradients in the fluid. However, the reference compensation scheme worked best with relatively slow and low amplitude thermal transients in the fluid, so reagent temperature was precisely controlled using a developed pulse width modulation (PWM) scheme on the cooling hardware. The PWM temperature control used a proportional-integral-derivative (PID) based algorithm that regulate the temperature of the reagent tightly about the set point by making slight adjustments to the temperature in ~400 μs increments. The PWM algorithm was found to control the temperature of the fluid with a standard deviation of 0.05° C. about the set temperature. This precise temperature control used in conjunction with reference compensation virtually removed all environmental artifacts from the calculated signal. Unfiltered TOF traces had a typical noise value of less than 1.0 nanosecond.

To reliably monitor formalin diffusion with our ultrasound equipment, a commercial dip-and-dunk tissue processor (FIG. 8A, Lynx II, Electron Microscopy Sciences) was retrofit with custom developed acoustic hardware. A mechanical head was designed using Solidworks® software to fit around and seal a standard reagent canister. Once sealed, an external vacuum system would initiate to degas the bulk reagent as well as the contents of the cassette, including the tissue. A cassette holder was designed for use with a standard sized histological cassette (FIG. 8D, Cell-Safe 5, CellPath) that securely held the tissue to prevent the sample from slipping during the experiment. The cassette holder was attached to a vertical translation arm that would slide the cassette holder in one direction. The mechanical head was designed with two metal brackets on either side of the tissue cassette (FIG. 8B). One bracket housed 5 transmitting transducers. The other bracket housed 5 receiving transducers that were spatially aligned with their respective transmitting transducers. The receiving bracket also housed a pair of transducers that were oriented orthogonal to the propagation axis of the other transducers (FIG. 8C). This set of transducers served as a reference channel. Additionally, at the end of each 2D acquisition, the cassette was raised up and a second reference acquisition was acquired. These reference TOF values were used to compensate for environmentally-induced fluctuations in the formalin.

After each acquisition the orthogonal reference sensors would calculate a TOF value that was used to detect spatiotemporal variations in the fluid that had a profound effect on sound velocity. The cassette was then translated ≈1 mm vertically and the TOF value was calculated at the new position for all transducer pairs. The process was repeated to cover the entire cassette. The 2nd and 4th transducer pairs (FIG. 8C, bottom row) were turned off when scanning tissue in a standard sized cassette. This enabled the 1st, 3rd, and 5th transducer pairs (FIG. 8C, top row) to each scan one of the center three subdivisions of the cassette. Two tissue cores were then placed in each column, one on the top and one on the bottom. This setup enables TOF traces from 6 samples (2 rows×3 columns) to simultaneously be obtained and significantly decreased run to run variation and increased throughput. The process was repeated over the course of the experiment for several hours until the tissue reached osmotic equilibrium and no more diffusion occurred producing a temporally flat TOF signal. One complete acquisition at all spatial locations takes about 90 seconds, although near real-time data acquisition is possible at one location (Δt<1 second).

D. TOF Data Analysis

As previously stated the TOF in fluid is highly dependent on thermal fluctuations within the bulk media. To compensate for these deviations the reference TOF value was subtracted from the TOF value obtain through the tissue and formalin to isolate the phase retardation from the tissue without spurious signals. When using the orthogonal reference sensors, a scaling factor was used to adjust for the slight geometrical difference in spacing between these two sensors and the pairs of scanning sensors. The reference compensated TOF traces from tissue, from now on referred to simply as the TOF, were empirically determined to be highly correlated with a single exponential curve of the form of Equation 1:

$$TOF(x,y,t) = C(x,y) + Ae^{-t/\tau(x,y)}$$

where C is a constant offset in ns, A is the amplitude of the decay in ns, τ is the decay constant in hours, and the spatial dependence (x, y) is explicitly stated. The signal amplitude represents the magnitude of the diffusion and is thus directly proportional the amount of fluid exchange. The decay constant represents the time for the amplitude to decrease by 63% and is inversely proportional to the rate of formalin diffusion into the tissue (i.e. large decay constant=slowly diffusing). To calculate these metrics, TOF diffusion trends were fitted to the above equation using non-linear regression. Additionally, because of the scanning capabilities of our system we can calculate and track which spatial volume of the tissue diffuses the slowest. This decay constant represents the limiting factor for when the tissue is thoroughly diffused and is referred to as the slowest decay constant ($\tau_{slowest}$). For example, all TOF signals from the sample indicated with dashed green lines in FIG. 9B are graphed in FIG. 3. One can see a large variability in both the decay rate and amplitude of the spatially-varying signals. To mitigate spurious white noise in the reference-compensated TOF data, a $3^{rd}$ order Butterworth filter was utilized. This filter preserved the low-frequency components of the exponential diffusion decay while removing high-frequency noise. Referenced to a single exponential decay, unfiltered TOF data had a typical root-mean-square-error of about 1 nanosecond, which was reduced to 200-300 picoseconds after filtering.

E. Results

E1. Histologically Guardbanding Diffusion Times

It was previously shown that a cold+warm fixation protocol with NBF was beneficial to preservation of histomorphology as well as proteins with activation states. Chafin et al., *Rapid two-temperature formalin fixation*, PloS One 8, e54138 (2013). This deviation from room temperature fixation was originally termed the 2+2 protocol due to successive immersion of tissues for 2 hours into 4° C. and 45° C. NBF with tissues up to 4 mm in thickness. The scientific principal behind this rapid protocol is the ability to diffuse enough formaldehyde into all of the tissue during the diffusion (cold step) before initiating crosslinking (warm step). In the initial report, this was accomplished on a purely empirical basis by altering diffusion times and temperatures and examining the quality of histomorphology and immunohistochemistry staining. In order to fine tune the protocol, we have developed a method to monitor the diffusion of cold NBF in real time with ultrasound diffusion based detection.

Diffusion of NBF into tissue sections is controlled mainly by concentration of formaldehyde and time. Since NBF is a fixed concentration of formaldehyde (3.7% W/V), we reasoned there must be a minimum exposure time to cold NBF that produces excellent histomorphology. A simple time course experiment was performed (FIG. 10) using 6 mm cores of human tonsil tissues submerged into 4° C. NBF followed by 1 hour in 45° C. NBF. We have previously determined that a shorter warm step can be standardized if sufficient formaldehyde is present in the sample. After multiple experiments were analyzed, a minimum of 3 hours of cold NBF (3+1) is required to produce good histomorphology. Tissue morphology was slightly better after 5 hours (5+1) but no additional benefit was seen at longer times with this one tissue type. Multiple cores were then examined using both 3+1 and 5+1 protocols as verification (FIG. 10).

E2. Diffusing Monitoring Validation and Tonsil Characterization

Having characterized the needed diffusion times for 6 mm tonsils, we next sought to correlate those findings with the needed amount of crosslinking agent throughout the specimen as detected with our TOF-based diffusion monitoring technology. A total of 39 six mm human tonsil samples were imaged using TOF in cold (7±0.5° C.) 10% NBF. Of the 39 samples, 15 were monitored for 3 hours and the remaining 24 samples were scanned for 5 hours. The slowest spatial decay constants for each sample are plotted in FIG. 11. Samples monitored for 3 and 5 hours had average diffusion decay constants of 4 hours and 16 minutes and 4 hours and 38 minutes, respectively. The difference in diffusion times of 22 minutes is relatively small (<10%) and statistically insignificant (p=0.45), indicating that the two datasets come from the same distribution and are measuring the same physical phenomena. This establishes that our detection mechanism is accurate down to at least three hours of scan time. On average for the cumulative dataset, the average decay time of the slowest diffusing region of each tissue was 4.5 hours.

E3. Measured Diffusion Rates of Different Tissues

The properties of several hundred samples of a variety of other tissue samples were then recorded with our TOF tissue monitoring device. Raw data plotting the decay constants at the slowest diffusing part of each sample are displayed in FIG. 12. A total of 236 samples were monitored representing 33 distinct organs and types of biological tissue. Only samples 5-7 mm thick were considered in this study. The range of tissue thicknesses was necessary because tissue is inherently gelatinous in nature and thus difficult to cut to a precise thickness. Reliable trends were recorded from all sampled tissue types indicating our diffusion monitoring technology is compatible with an assortment of different tissue types. There is an extreme amount of variability in rate of formalin diffusion, even within individual tissue types, with several tissues' demonstrating maximum to minimum differences of multiple hours. This was to be expected because tissue is known to be highly heterogeneous. Additionally, the average decay constant from each respective group varies significantly, indicating drastically different diffusion rates across different organs and types of tissues.

The average decay constant from each respective organ type is displayed in FIG. 6A sorted from lowest to highest decay constant. Displayed in this fashion, more quickly diffusing tissues register to the left (i.e. smaller decay constants) and slowly diffusing tissues register to the right (i.e. larger decay constants). Importantly, we see that several of the tissue types ASCO/CAP has recognized as needing extra time in formalin (e.g. breast, brain, fat) are located on the far right of the graph amongst the slowest quarter of tissues. Therefore, our TOF diffusion monitoring system has confirmed the ASCO/CAP guidelines of slowing diffusing tissues.

E4. Required Cold Diffusion Time for Ideal Staining

Previously in Section E1 we detailed that 6 mm human tonsil samples require at most 5 hours of cold diffusion time in 10% NBF to have optimal of 4.5 hours. We therefore generate an empirically determined time needed in cold formalin as Equation 2:

$$\frac{t_{done}}{\tau_{slowest}} = \frac{5 \text{ hour}}{4.5 \text{ hour}} \Rightarrow t_{done} \approx \tau_{slowest}$$

where $t_{done}$ is the needed diffusion time in cold formalin and $\tau_{slowest}$ represents the decay constant of the slowest diffusing volume of the tissue. From this general equation we observe and conclude that samples having diffused to approximately one decay constant will have sufficient crosslinking agent throughout to stain properly. This general ground rule would thus apply to all different types of tissues because the time needed to sufficiently perfuse a tissue will scale with the rate of diffusion. In other words, slowly diffusing tissues will automatically need longer diffusion times whereas faster diffusing tissues will require less time in formalin.

The decay constants from the cumulative tissue dataset were analyzed to determine how long samples needed to be subjected to cold diffusion in 10% NBF to produce excellent downstream biomarker preservation. The probability density function (PDF) is plotted in FIG. 6B. The majority of samples have a slowest decay constant of about 2 hours. A significant portion display values up to roughly 4 hours and further outliers can be seen with even longer decay constants.

The cumulative density function (CDF) is plotted in FIG. 6C, which represents the integral of FIG. 6B. From the CDF 52.5% of samples have a slowest decay constant of less than 2 hours. Similarly, 84.8% of samples have decay constants less than 4 hours and 92.8% are less than 6 hours. From the tonsil-based experiments and Eq. 2, the data suggests that tissue samples need to be in cold formalin for an amount of time approximately equal to their slowest decay constant. Therefore, FIG. 6C would predict that nearly 93% of samples' cold soaked in 10% NBF for 6 hours would stain pristinely with downstream assays. Our estimate of needing one decay constant of cold diffusion time is based on perfect staining throughout that sample. This threshold is substantially more stringent that what is considered a diagnosable slide in current medical practice. Additionally, our ruleset was determined based on the amount of formalin in the slowest diffusing part of the tissue, meaning at threshold the majority of the tissue already has more than the critical amount of formalin needed for ideal staining. It therefore stands to reason that the remaining 7% of samples that are not at threshold after 6 hours of cold diffusion will still stain adequately enough for a clinician to make a diagnosis.

We therefore state that, $$t_{done}(\text{all tissue types}) \leq 6 \text{ hours,} \quad \text{(Equation 3)}$$

for samples up to 7 mm thick cold soaked in 10% NBF. It is important to note that this $t_{done}$ was calculated exclusively from samples 5-7 mm thick. However, because diffusion time scales with the square of tissue thickness, samples smaller than 5 mm will diffuse significantly faster than larger tissues. Because additional time in cold formalin has no detrimental $t_{done}$ effects on cancer biomarker or tissue morphological status, the presented t will well preserve cancer biomarkers and morphology in all samples up to 7 mm thick. Many factors will affect the rate at which the crosslinking agent formalin will perfused tissue including sample composition, thickness, temperature, orientation in cassette, and preanalytical tissue handling to name a few. The presented time needed in cold formalin is especially powerful because all of these factors are taken into account. Additionally, the large number of samples monitored in our study and the scanning capability of our system ensure 6 hours in cold formalin will ideally preserve tissue despite variability from different types of tissue (intersample variation) as well as contributions from tissue heterogeneity (intrasample variation). Moreover, because the slowest diffusing tissues (fat, brain, etc) were included in this study, we are confident other types of tissues not exclusively monitored will not be the limiting factor of a potential protocol. Thus, all samples up to 7 mm thick will stain properly after 6 hours in cold formalin.

E5. Staining Results for 6+1 Universal Protocol

To verify that a static 6+1 fixation protocol can be used for general histology workflow, histomorphology of several tissue types was examined Tissues were chosen based on availability and relative TOF diffusion rates to encompass slow, medium, and fast categories (See FIG. 6A). Several 6 mm cores of human skin+fat, tonsil, colon and kidney were fixed with a static 6+1 and as comparison 24 hr room temperature protocol and analyzed for quality of histomorphology (FIG. 13). All samples fixed with the 6+1 protocol had identical histomorphology compared to the same samples fixed with gold standard methods. This small pilot study verifies that an analytical technique, based on time of flight principles, can be used to monitor relative diffusion of NBF in real time and optimize results.

F. Discussion

The present state-of-the-art in tissue processing and preservation is a one size fits all workflow that is profoundly unprepared for specimen handling in a personalized medicine workflow. This methodology cannot take into account sample specific variations in the concentration of formalin throughout the tissue, which is governed by the variable rate of formalin uptake by individual tissues. This study detailed a real-time diffusion monitoring system based on subnanosecond acoustic time-of-flight differences generated by the exchange of NBF and interstitial fluid during active reagent diffusion. Diffusion trends were empirically correlated with needed diffusion time, based on morphological staining results, in order to predict the needed amount of crosslinking agent necessary to guarantee ideal staining. Diffusion monitoring was then employed in a broad tissue collection study comprising over 200 individual samples and 33 different human organs. Results were coalesced and indicate that all tissue types, up to 7 mm thick, will produce diagnosable staining throughout the sample after 6 hours in cold 10% NBF and that the vast majority of samples (≈93%) with stain ideally after this time in cold formalin. The observation that 6 hours of cold diffusion time would produce quality staining was then confirmed by staining several types of tissues processed with the 6+1 protocol. Overall, this research indicates a simple 6+1 protocol can standardize and optimize tissue processing across all types of tissues, up to 7 mm thick, and help ensure biomarker and morphological structure preservation with a rapid protocol compared to standard room temperature fixation.

The invention claimed is:

1. A method of fixing a tissue sample comprising: (a) immersing the tissue sample in a first aldehyde-based fixative comprising about 10% neutral-buffered formalin at a temperature ranging from between about 5° C. to about 12° C., and permitting the first aldehyde-based fixative to diffuse into the tissue sample; (b) continuously monitoring in real-time the diffusion of the first aldehyde-based fixative into the tissue ample, wherein the monitoring comprises measuring a time of flight of acoustic waves through the tissue sample; and (c) after a pre-determined threshold diffusion constant is reached, heating the obtained fixative-diffused tissue sample in the presence of a second aldehyde-based fixative comprising about 10% neutral-buffered formalin at a temperature raging from between about 20° C. to about 55° C. for a pre-determined time period, wherein the tissue sample does not exceed about 7 mm in thickness; and wherein the method does not comprise exposing the tissue sample to ultrasonic waves at an intensity of about 1 W/cm$^2$ or greater.

2. The method of claim 1, wherein the tissue sample is greater than about 4 mm thickness.

3. The method of claim 1, wherein the tissue sample has a thickness of at least about 5 mm.

4. The method of claim 1, wherein the tissue sample has a thickness of at least about 6 mm.

5. The method of claim 1, wherein the method does not comprise exposing the tissue sample to ultrasonic waves at an intensity of about 0.5 W/cm$^2$ or greater.

6. The method of claim 1, wherein the method does not comprise exposing the tissue sample to ultrasonic waves at an intensity of about 0.2 W/cm$^2$ or greater.

7. The method of claim 1, wherein the method does not comprise exposing the tissue sample to ultrasonic waves at an intensity of about 0.05 W/cm$^2$ or greater.

8. The method of claim 1, wherein the method does not comprise exposing the tissue sample to ultrasonic waves at an intensity of about 0.02 W/cm$^2$ or greater.

9. The method of claim 1, further comprising staining the tissue sample for the presence of one or more biomarkers.

10. The method of claim 1, wherein the fixed tissue sample comprises histomorphology similar to a tissue specimen fixed for 24 hours at room temperature.

11. The method of claim 1, wherein the first and second aldehyde-based fixatives comprise the same volume of 10% neutral-buffered formalin.

12. A method of fixing a tissue sample comprising: (a) immersing the tissue sample in a first aldehyde-based fixative comprising 10% neutral-buffered formalin at a temperature ranging from between 5° C. to 12° C., and permitting the first aldehyde-based fixative to diffuse into the tissue; (b) continuously monitoring in real-time the diffusion of the first aldehyde-based fixative into the tissue ample, wherein the monitoring comprises measuring a time of flight of acoustic waves through the tissue sample; and (c) after a pre-determined threshold diffusion constant is reached, heating the obtained fixative-diffused tissue sample in a second aldehyde-based fixative comprising 10% neutral-buffered formalin for a time period of 1 hour, wherein the second aldehyde-based fixative is pre-heated to a temperature of 20° C. to 55° C.; wherein the method does not comprise exposing the tissue sample to ultrasonic waves at an intensity of about 1 W/cm$^2$ or greater; and wherein the tissue sample does not exceed about 7 mm in thickness.

13. The method of claim 12, wherein the tissue sample is immersed in the first aldehyde-based fixative at a temperature below 10° C.

14. The method of claim 12, wherein the fixed tissue sample comprises histomorphology similar to a tissue specimen fixed for 24 hours at room temperature.

15. The method of claim 12, wherein the tissue sample is immersed in the first aldehyde-based fixative at a temperature below about 10° C.

16. A method of fixing a tissue sample comprising: (a) immersing the tissue sample in a first aldehyde-based fixative at a temperature ranging from between about 5° C. to about 12° C., and permitting the first aldehyde-based fixative to diffuse into the tissue sample; (b) continuously monitoring in real-time the diffusion of the first aldehyde-based fixative into the tissue sample, wherein the monitoring comprises measuring a time of flight of acoustic waves through the tissue sample; and (c) after a pre-determined threshold diffusion constant is reached, heating the obtained fixative-diffused tissue sample in the presence of a second aldehyde-based fixative at a temperature raging from between about 20° C. to about 55° C. for a pre-determined time period; and wherein the method does not comprise exposing the tissue sample to ultrasonic waves at an intensity of about 1 W/cm$^2$ or greater.

17. The method of claim 16, further comprising (d) monitoring a fixation of the obtained fixative-diffused tissue sample by measuring the time of flight of acoustic waves through the obtained fixative-diffused tissue sample.

* * * * *